(12) United States Patent
Balsbaugh

(10) Patent No.: US 9,943,766 B2
(45) Date of Patent: Apr. 17, 2018

(54) SYSTEMS AND METHODS FOR COMPETITIVE SKILL-BASED FANTASY SPORTS

(71) Applicant: Michael Brian Balsbaugh, Las Vegas, NV (US)

(72) Inventor: Michael Brian Balsbaugh, Las Vegas, NV (US)

(*) Notice: Subject to any disclaimer, the term of this patent is extended or adjusted under 35 U.S.C. 154(b) by 40 days.

(21) Appl. No.: 15/073,213

(22) Filed: Mar. 17, 2016

(65) Prior Publication Data

US 2016/0271501 A1   Sep. 22, 2016

Related U.S. Application Data

(60) Provisional application No. 62/134,323, filed on Mar. 17, 2015, provisional application No. 62/217,498, filed on Sep. 11, 2015.

(51) Int. Cl.

| | |
|---|---|
| *A63F 9/24* | (2006.01) |
| *A63F 13/828* | (2014.01) |
| *A63F 13/35* | (2014.01) |
| *G07F 17/32* | (2006.01) |
| *A63F 13/65* | (2014.01) |
| *A63F 13/795* | (2014.01) |
| *A63F 13/61* | (2014.01) |
| *A63F 13/537* | (2014.01) |

(52) U.S. Cl.
CPC ............ *A63F 13/828* (2014.09); *A63F 13/35* (2014.09); *A63F 13/61* (2014.09); *A63F 13/65* (2014.09); *A63F 13/795* (2014.09); *G07F 17/32* (2013.01); *A63F 13/537* (2014.09)

(58) Field of Classification Search
CPC ..................................................... A63F 13/828
See application file for complete search history.

(56) References Cited

U.S. PATENT DOCUMENTS

| | | | |
|---|---|---|---|
| 8,315,722 B1 * | 11/2012 | Russo ................... | A63F 13/798 463/4 |
| 2002/0143412 A1 * | 10/2002 | Spector ................. | A63B 71/06 700/91 |
| 2006/0183548 A1 * | 8/2006 | Morris .................... | G07F 17/32 463/42 |
| 2007/0072679 A1 * | 3/2007 | Kerns ..................... | A63F 13/10 463/42 |

(Continued)

*Primary Examiner* — Steve Rowland
(74) *Attorney, Agent, or Firm* — C. John Brannon; Brannon Sowers & Cracraft PC

(57) ABSTRACT

Methods and systems for establishing fantasy sports competitions. In one aspect, a method includes generating fantasy team rosters, each fantasy team roster including distinct individual athletes, where each fantasy team roster is balanced to the other fantasy team rosters based on historical data from a database of computed fantasy sports statistics and a database of predictive modeling of projected individual fantasy sports statistics; receiving selected teams within the at least two fantasy team rosters from users; obtaining real-time statistics of the athletes; creating a dynamic database including fantasy scoring of the athletes based on a fantasy scoring scheme; and displaying in real time the dynamic database comparing the fantasy sports statistics for each fantasy team roster to determine which fantasy team roster has amassed higher scoring fantasy sports statistics based on the fantasy scoring scheme.

2 Claims, 21 Drawing Sheets

(56) References Cited

U.S. PATENT DOCUMENTS

| | | | | |
|---|---|---|---|---|
| 2008/0281444 | A1* | 11/2008 | Krieger | A63F 13/12 700/91 |
| 2009/0156311 | A1* | 6/2009 | Ng | A63F 13/12 463/42 |
| 2010/0137057 | A1* | 6/2010 | Fleming | A63F 13/12 463/25 |
| 2011/0237317 | A1* | 9/2011 | Noonan | A63F 13/828 3/828 |
| 2015/0231507 | A1* | 8/2015 | Vu | A63F 13/828 3/828 |
| 2015/0375117 | A1* | 12/2015 | Thompson | A63F 13/35 3/35 |

* cited by examiner

Fig. 4

| Rank | User | Competitions Entered | Total Pts. | Avg. Pts. | Trend |
|---|---|---|---|---|---|
| 1 | A | 9 | 137 | 15.22 | 3.62 |
| 2 | B | 7 | 106 | 15.4 | 2.11 |
| 3 | C | 3 | 47 | 15.66 | 2.06 |
| 4 | D | 4 | " | " | 1.90 |
| 5 | E | 2 | " | " | 1.60 |
| 6 | F | 2 | " | " | 1.10 |
| 7 | G | 2 | " | " | 0.90 |
| 8 | H | 1 | " | " | 0.07 |
| 9 | I | 1 | " | " | -1.0 |
| 10 | J | 1 | " | " | -1.4 |
| 11 | K | 1 | " | " | -1.3 |
| " | " | " | " | " | " |

Time Until End Of Play
43:27:04 ← *720*

| Rank | Player | Root Against | Trend | Current Score |
|---|---|---|---|---|
| 1 | Player A | Expected to score 10 more pts. | 2.41 | 43 |
| 2 | Player C | Expected to score 8 more pts. | 1.79 | 30 |
| 3 | Player E | Expected to score 4 more pts. | 1.11 | 22 |
| 4 | Player B | * * * * * | * * * * | * |
| 5 | Player G | * * * * * | * * * * | * |
| 6 | Player D | * * * * * | * * * * | * |
| 7 | * * * | * * * * * | * * * * | * |
| 8 | * * * | *1370* | * * * * | * |
| 9 | * * * | * * * * * | * * * * | * |
| 10 | * * * | * * * * * | * * * * | * |

| Rank | Player | Root For | | |
|---|---|---|---|---|
| 1 | Player Z | Underperforming by 31 pts. | -3.21 | 43 |
| 2 | Player W | Underperforming by 10 pts. | -2.11 | 30 |
| 3 | Player R | Not expected to score | -1.07 | 22 |
| 4 | Player X | * * * * * | * * * * | * |
| 5 | Player Y | * * * * * | * * * * | * |
| 6 | Player S | * * * * * | * * * * | * |
| 7 | * * * | * * * * * | * * * * | *1360* |
| 8 | * * * | * * * * * | * * * * | * |
| 9 | * * * | * * * * * | * * * * | * |

SYSTEMS AND METHODS FOR COMPETITIVE SKILL-BASED FANTASY SPORTS

CROSS-REFERENCE TO RELATED APPLICATIONS

This application claims the benefit under 35 U.S.C. § 119(e) of U.S. Patent Application No. 62/134,323, entitled "SYSTEMS AND METHODS FOR FANTASY SPORTS COMPETITIONS," filed Mar. 17, 2015, and also of U.S. Patent Application No. 62/217,498, entitled "SYSTEMS AND METHODS FOR COMPETITIVE FANTASY SPORTS ANALYSIS," filed Sep. 11, 2015, the disclosures of which are incorporated herein by reference in their entirety.

BACKGROUND

This specification relates to the field of gaming. More specifically, the present technology is in the technical field of statistical compilation, analysis, and predictive modeling of sports gaming.

While physically participating in sports, attending sporting events, and wagering on the outcome of particular sporting events is a popular pastime for tens, hundreds, or millions of people per year, fantasy sports leagues have filled a much-needed void in the sports and gaming field. Originating somewhere in the mid-1900s, fantasy sporting is typically a game wherein participants may act as owners to build a sports team and then compete against other fantasy owners based on statistics generated from real-life players, teams, and sporting events. For many of these fantasy "leagues," teams remain static, or mostly static, for an entire sporting season.

In a more recent evolution of the fantasy sporting field, daily fantasy sports allow participants to compete in daily fantasy sports contents that last a short period of time (e.g., one day, one weekend, etc.). These contents may tend to be quicker and more numbers-driven, engaging users in fast-paced, exciting competition against fellow fantasy players.

However, both the traditional fantasy sports concept and the newer daily fantasy sports concept involve large learning curves and often include complex and dynamic calculations for scoring systems. Newer participants often may not understand how they are currently being ranked, for which teams/players they should be rooting against, and/or for which teams/players they should be rooting for.

Additionally, such competitions are difficult due in part to the fast-paced nature of daily fantasy sports competitions, and these skill-based competitions often require participants to select rosters from large datasets. Further, the time required to select and track fantasy sports picks is often greater than the time available to many individuals, presenting a great time requirement and culling a large potential user base for such games. These factors present major hurdles for newer participants in the fantasy and daily fantasy arenas, while not significantly modifying difficulty levels of actually being successful within a fantasy sports competition given equally skilled competitors.

The present novel technology addresses these needs.

SUMMARY

This specification describes technologies relating to sports gaming. More specifically, these technologies relate to software-based fantasy sports gaming.

One aspect of the present novel technology may include a method for establishing and comparing a fantasy sports competition. Another aspect may include a system for providing a comparative fantasy sports system using dynamic database interface generation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 depicts a screenshot of the fantasy sports system including an example competition scoring structure.

FIG. 13A depicts a screenshot of another embodiment of the fantasy sports system including a competitive analysis view ranking users of competition(s).

FIG. 13B depicts a screenshot of the competitive analysis view embodiment of the fantasy sports system including root against and root for rankings.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not always occur, and that the description includes instances where said event or circumstance occurs and instances where it does not. Additionally, "generates," "populates," "generating," and "populating" mean that the fantasy sports system, client, end user (user, system user), and/or module may produce some event or cause some event element to be produced.

Figure 1:
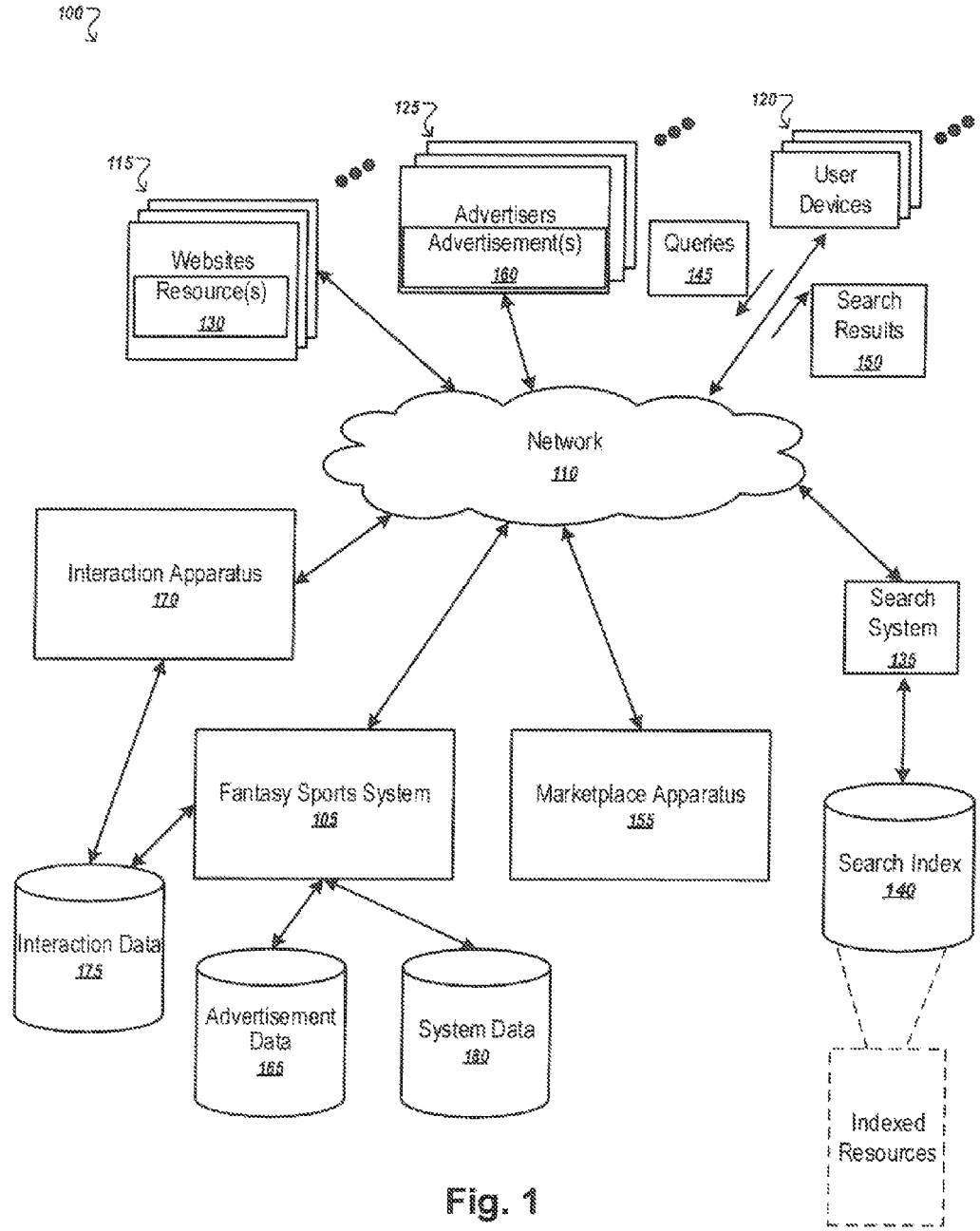
FIG. 1 is a block diagram of an example environment in which the fantasy sports system may exist.

FIG. 1 is a block diagram of an example environment 100 in which fantasy sports system 105 may exist. Environment 100 typically may include fantasy sports system 105; network 110; website(s) 115; end user device(s) 120; advertiser(s) 125; resource(s) 130; search system 135; search index 140; queries 145; search result(s) 150; marketplace apparatus 155; advertisement(s) 160; advertisement data 165 (also referred to as advertisement data store or database); interaction apparatus 170; interaction data 175 (also referred to as interaction data store or database); and/or system data 180 (also referred to as system data store or database). Example environment 100 may also include network 110, such as a local area network (LAN), a wide area network (WAN), the Internet, or a combination thereof. Network 110 typically may connect websites 115, end user device(s) 120, and/or fantasy sports system 105. Example environment 100 may potentially include many thousands of website(s) 115 and/or end user device(s) 120.

Website(s) 115 (apps, client services; hereinafter simply "websites" for ease of use) may be one or more resources 130 associated with a domain name and hosted by one or more servers. An example website(s) 115 may be a collection of webpages formatted in hypertext markup language (HTML) that may contain text, images, multimedia content, and programming elements, such as scripts. Each website(s) 115 may be maintained by a publisher, which may be an entity that controls, manages, and/or owns each website(s) 115. In the present fantasy sports system 105, website(s) 115 may be generated and presented to end user device(s) 120 (e.g., on a phone, bar display, desktop computer, and/or the like) while participating in a fantasy sports competition. Website(s) 115 may also be generated and displayed to user(s) to check on current events, access user's account, change personal information (e.g., billing, address, display style, etc.), and the like. Website 115 typically may be hosted on one or more servers and/or third-party services, which then provide access to website 115 and/or resources 130 through network 110.

In some implementations, fantasy sports system 105 may host and/or operate the one or more servers hosting website 115. In other implementations, websites 115 and/or resources 130 may be external real-world sporting data sources, databases, and/or the like that system 105 may query and/or retrieve data from for system 105 operation and/or calculations.

Resource(s) 130 may be any data that may be provided over the network 110. A resource(s) 130 may be identified by a resource address (e.g., a URL) that may be associated with the resource(s) 130. Resources 130 include HTML webpages, word processing documents, and portable document format (PDF) documents, images, video, and feed sources, to name only a few. Resources 130 may include content, such as words, phrases, images and sounds, that may include embedded information—such as meta-information in hyperlinks—and/or embedded instructions, such as JAVASCRIPT scripts (JAVASCRIPT is a registered trademark of Sun Microsystems, Inc., a Delaware corporation, located at 4150 Network Circle Santa Clara, Calif. 95054). Units of content—for example, data files, scripts, content files, or other digital data—that may be presented in (or with) resources may be referred to as content items. In some implementations, resource(s) 130 may be locally cached and/or stored (e.g., on user device(s) 120 for generation.

End user devices 120 may be electronic devices that may be under the control of an end user and may be capable of requesting and/or receiving resources 130 over network 110 or from local storage. Example end user devices 120 include personal computers, mobile communication devices, bar-style gaming consoles, and/or any other devices that may send and/or receive data over network 110. End user devices 120 typically include a user application, such as a web browser or the like, to facilitate the sending and receiving of data over the network 110.

In some implementations, websites 115, end user devices 120, and system 105 may directly intercommunicate, excluding the need for the Internet from the scope of a network 110. For example, the websites 115, end user devices 120, and fantasy sports system 105 may directly communicate over device-to-device (D2D) communication protocols (e.g., WI-FI DIRECT (WI-FI DIRECT is a registered trademark of Wi-Fi Alliance, a California corporation, located at 10900-B Stonelake Boulevard, Suite 126, Austin, Tex. 78759); Long Term Evolution (LTE) D2D (LTE is a registered trademark of Institut Européen des Normes; a French nonprofit telecommunication association, located at 650 route des Lucioles, F-06921, Sophia Antipolis, France), LTE Advanced (LTE-A) D2D, etc.), wireless wide area networks, and/or satellite links thus eliminate the need for the network 110 entirely. In other implementations, the websites 115, end user devices 120, and system 105 may communicate indirectly to the exclusion of the Internet from the scope of the network 110 by communicating over wireless wide area networks and/or satellite links. Further, end user devices 120 may similarly send and receive search queries 145 and search results 150 indirectly or directly.

In wireless wide area networks, communication primarily occurs through the transmission of radio signals over analog, digital cellular, or personal communications service (PCS) networks. Signals may also be transmitted through microwaves and other electromagnetic waves. At the present time, most wireless data communication takes place across cellular systems using second generation technology such as code-division multiple access (CDMA), time division multiple access (TDMA), the Global System for Mobile Communications (GSM) (GSM is a registered trademark of GSM MoU Association, a Swiss association, located at Third Floor Block 2, Deansgrande Business Park, Deansgrande, Co Dublin, Ireland), Third Generation (wideband or 3G), Fourth Generation (broadband or 4G), personal digital cellular (PDC), or through packet-data technology over analog systems such as cellular digital packet data (CDPD) used on the Advance Mobile Phone System (AMPS).

The terms "wireless application protocol" and/or "WAP" mean a universal specification to facilitate the delivery and presentation of web-based data on handheld and mobile devices with small user interfaces. "Mobile Software" refers to the software operating system that allows for application programs to be implemented on a mobile device such as a mobile telephone or PDA. Examples of Mobile Software are JAVA and JAVA ME (JAVA and JAVA ME are trademarks of Sun Microsystems, Inc. of Santa Clara, Calif.), BREW (BREW is a registered trademark of Qualcomm Incorporated of San Diego, Calif.), WINDOWS Mobile (WINDOWS is a registered trademark of Microsoft Corporation of Redmond, Wash.), PALM OS (PALM is a registered trademark of Palm, Inc. of Sunnyvale, Calif.), SYMBIAN OS (SYMBIAN is a registered trademark of Symbian Software Limited Corporation of London, United Kingdom), ANDROID OS (ANDROID is a registered trademark of Google, Inc. of Mountain View, Calif.), and IPHONE OS (IPHONE is a registered trademark of Apple, Inc. of Cupertino, Calif.), and WINDOWS PHONE 7 (WINDOWS PHONE is a registered trademark the Microsoft Corporation of Redmond, Wash.). "Mobile Apps" refers to software programs written for execution with Mobile Software.

Fantasy sports system 105 may use one or more modules to perform various functions including, but not limited to, searching, analyzing, querying, interfacing, etc. A "module" typically refers to a portion of a computer system and/or software program that carries out one or more specific functions and may be used alone or combined with other modules of the same system or program. For example, a module may be located on fantasy sports system 105 (e.g., on the servers of system 105, i.e., server-side module), on end user devices 120, and/or on an intermediary device (e.g., the client server, i.e., a client-side module; another end user device(s) 120; a different server on the network 110; or any other machine capable of direct or indirect communication with system 105, websites 115, the search system 135, and/or the end user devices 120).

In some implementations, actions of the system 105 may be performed through one or more system 105 module(s). For example, a user may install a program to interface with a system 105 server to communicate data, matches, and results to the user's end user device(s) 120. In some other implementations, the system 105 may be installed on a user's machine and operate—in whole or in part—independently of system 105 WAN and/or LAN components. For example, the system 105 software may be deployed to a user's computer as a standalone program that interfaces with the user's computer, creates and maintains data store(s), generates fantasy matches, records match activity, analyzes results, and outputs match winnings.

Typically, modules may be coded in JAVASCRIPT, PHP, or HTML, but may be created using any known programming language (e.g., BASIC, FORTRAN, C, C++, C#, PERL (PERL is a registered trademark of Yet Another Society DBA The Perl Foundation, a Michigan nonprofit corporation, located at 340 S. Lemon Ave. #6055, Walnut, Calif. 91789)) and/or package (e.g., compressed file (e.g., zip, gzip, 7zip, RAR (RAR is a registered trademark of Alexander Roshal, an individual, located in the Russian Federation AlgoComp Ltd., Kosareva 52b-83, Chelyabinsk, Russian Federation 454106), etc.), executable, etc.).

In some implementations, fantasy sports system 105 may be packaged, distributed, scripted, installed by a technician of system 105, and/or otherwise deployed to a client server location such that system 105 exists within the client server and/or client server network, either in whole or in part. For example, fantasy sports system 105 may be scripted and/or packaged into an executable package and downloaded by a client administrator; the client administrator then installing system 105 software package(s) onto the client server(s). Such setups may allow fantasy sports system 105 to operate all system 105 operations entirely within the client server(s) and/or client network, excluding the need to interface with system 105 provider's servers for some or all system 105 functions. Such an implementation may, for example, be used to reduce bandwidth, latency, complexity of network management, etc. In some other implementations, the client servers may facilitate only some of system 105 functions and interface with system 105 servers (over a network or directly) to enable those remaining functions. Still other implementations may link to system 105 servers to obtain updates, patches, and/or other modifications to system 105 distributions.

Fantasy sports system 105 software distributions may, in some implementations, be installed in a virtual environment (e.g., HYPER-V (HYPER-V is a registered trademark of Microsoft, a Washington Corporation, located at One Microsoft Way, Redmond, Wash. 98052); VIRTUALBOX (VIRTUALBOX is a registered trademark of Oracle America, Inc., a Delaware corporation, located at 500 Oracle Parkway, Redwood Shores, Calif. 94065); VMWARE (VMWARE is a registered trademark of VMWare, Inc., a Delaware corporation, located at 3401 Hillview Ave., Palo Alto, Calif. 94304), etc.).

In other implementations, fantasy sports system 105 software may be installed in whole or in part on an intermediary system that may be separate from the client and system 105 servers. For example, fantasy sports system 105 software may be installed by an intermediary worker, a client worker, and/or a system 105 worker onto a hosting service (e.g., AMAZON WEB SERVICES (AWS) (AWS is a registered trademark of Amazon Technologies, Inc., a Nevada corporation, located at PO Box 8102, Reno, Nev. 89507), RACKSPACE (RACKSPACE is a registered trademark of Rackspace US, Inc., a Delaware corporation, located at 1 Fanatical Place, City of Windcrest, San Antonio, Tex. 78218), etc. The client may then connect to the intermediary and/or system 105 servers to access system 105 functions. Such implementations may, for example, allow distributed access, redundancy, decreased latency, etc.

In some further implementations, system 105 may operate to construct a dynamic database for fantasy scoring and/or ranking. For example, system 105 may receive and store real-life game event data (e.g., scores, player statistics, time, expected scores, team rank, etc.) and then store that data (e.g., in system database 180). System 105 may then calculate one or more synthetic fantasy scores for use in creating and/or curating system 105 fantasy teams, rosters, guides, picks, and/or the like. These calculations may occur following a scoring rubric from player and/or team statistics (described in example below), based on expert predictions, based on user activity and/or picks within system 105 environment, and/or the like. These synthetic fantasy scores may be stored, altered, modified, and/or otherwise curated from the system 105 databases, and then the scores may be presented in direct and/or indirect forms to system 105 users (e.g., as rosters, suggested picks, trends, and/or the like).

In some implementations, one or more predictive models may be computed and/or generated based on the scoring and/or ranking calculations. For example, system 105 may compute that team A is most likely to win every game in a tournament given a certain set of factors (e.g., time, starting player, weather, and/or the like). In other implementations, predictive models may be used to analyze and/or predict real-time trends, scoring, game events (e.g., penalties, stoppage time, and/or the like), fantasy competition prize winners, and/or the like. In still further implementations, such information may be stored in one or more databases, which may be dynamic databases integral to and/or separate from system 105, and which may typically act as a unique intermediary to provide ad-hoc, asynchronous, and/or real-time user interface display generation. Such dynamic generation typically may, for example, act to reduce latency, decrease predictive lag, increase immersion, and/or the like, which may be crucial to high-speed fantasy and/or daily fantasy sporting events.

End user device(s) 120 typically may request resources 130 from website(s) 115. In turn, data representing resource(s) 130 may be provided to end user device(s) 120 for presentation by end user device(s) 120 to users. Data representing resource(s) 130 may also include data specifying a portion of the resource(s) 130 or a portion of a user display—for example, a small search text box or a presentation location of a pop-up window—in which advertisements and/or search tools may be presented.

To facilitate searching of resource(s) 130, environment 100 may include a search system 135 that identifies resource(s) 130 by crawling and indexing resource(s) 130 provided by publishers on website(s) 115. For example, system 105 may internally search and index to determine recent matches, victors, trends, etc. Websites 115 may track and/or store real-time and/or historical real-world sports competition data, which system 105 may then query, retrieve, calculate, and/or otherwise process for use with system 105 (such operations are described in greater detail below). Alternatively, external website(s) 115 may be searched and indexed for recent match statistics, predictions, trends, etc. Data about resource(s) 130 may be indexed based on resource(s) 130 to which the data corresponds. The indexed and, optionally, cached copies of resource(s) 130 may be stored in, for example, search index 140 and/or system data 180.

End user device(s) 120 may submit search queries 145 to search system 135 over network 110. In response, search system 135 may access search index 140 to identify resource(s) 130 that may be relevant to search query 145. Search system 135 identifies the resources 130 in the form of search result(s) 150 and returns the search result(s) 150 to end user devices 120 in search results webpages. A search result(s) 150 may be data generated by the search system 135 that identifies a resource(s) 130 that may be responsive to a particular search query, and includes a link to the resource(s) 130. An example search result(s) 150 may include a webpage title, a snippet of text or a portion of an image extracted from the webpage, and the URL of the webpage.

Users that may be interested in a particular subject may perform a search by submitting one or more queries 145 to search system 135 in an effort to identify related information. For example, a user that may be interested sports may submit queries 145 such as "news," "sports," or "technology." In response to each of these queries 145, the user may be provided search result(s) 150 that have been identified as responsive to the search query—that is, have at least a minimum threshold relevance to the search query, for example, based on cosine similarity measures or clustering techniques. The user may then select one or more of the search result(s) 150 to request presentation of a webpage or other resource(s) 130 that may be referenced by a URL associated with the search result(s) 150.

Other implementations of fantasy sports system 105 may allow for a game-like components, or gamification, aspect to interaction with system 105. For example, tangible (e.g., money, goods, etc.) and/or intangible (e.g., account badges, user name flair, etc.) rewards may be given to users who donate money to system 105, users voted most active on system 105, etc.

When search result(s) 150 are requested by an end user device(s) 120, fantasy sports system 105 may receive a request for data to be provided with the resource(s) 130 or search results 150. In response to the request, fantasy sports system 105 may select data that are determined to be relevant to the search query. In turn, the selected data are provided to the end user device(s) 120 for presentation with the search results 150.

For example, in response to the search query "soccer," system 105 may present the user with relevant soccer and/or World Cup-related results. If the user selects—for example, by clicking or touching—search result(s) 150, the end user device(s) 120 may be redirected, for example, to a webpage containing compiled soccer team rankings. This webpage may include, for example, which teams are expected to win certain matches, which players are rising in popularity, which players are out with injuries, etc.

In some implementations, the returned webpage may include some or all of the resources 130 that are required to complete a financial transaction for a service or product relevant to fantasy sports system 105. For example, the webpage may enable the user to add products to an electronic "shopping cart" and enter payment and/or shipping information. Some of these webpages may be secure webpages that protect the users' payment information and/or other sensitive information—for example, the user's address and name. Additionally, the website may include code that completes financial transactions—such as credit card transactions, online payment transactions, or other financial transactions. In some implementations, end user device(s) 120 may include magnetic readers, currency accepters, near field communication (NFC) readers, biometric authenticators, and/or the like for receiving payments from users.

In other implementations, the returned webpage may include code that references a marketplace apparatus 155 that is used to complete the transaction. The marketplace apparatus 155 is a data processing apparatus that is configured to facilitate sales transactions between buyers and sellers over the network 110. The marketplace apparatus 155 may be configured to provide electronic "shopping carts," perform financial transactions, provide transaction confirmation data to the buyer and/or seller, and/or provide shipment-tracking information if the user purchases physical goods, such as artist or author merchandise.

For example, a webpage may include code that causes a checkout user interface element—for example, a checkout button—to be presented to the user. In response to the user clicking on the checkout user interface element, checkout data may be provided to the marketplace apparatus 155 indicating that the user is ready to agree to an exchange or complete a purchase. The checkout data may include product identifiers specifying the products that the user has selected to purchase, quantities of each product that the user has selected to purchase, and prices associated with the selected products. These products may be, for example, system 105 gift cards or tokens, certificates of scores or rankings from system 105, match buy-ins, etc. These identifiers may be in addition to terms of the exchange or included within the terms of the exchange. In response to receipt of the checkout data, the marketplace apparatus 155 may provide the user with a transaction interface that enables the user to submit payment information and shipping information to complete the transaction. Once the transaction is complete, the marketplace apparatus 155 may provide the user with confirmation data confirming the details of the transaction. In some implementations, marketplace apparatus 155 may be integrated into system 105's matching process. For example, system 105 may present dialog for receiving and/or retrieve previously entered payment information (e.g., credit card data) before, during, and/or after a user has entered into a fantasy sports competition using system 105, with or without needing to navigate to a separate webpage.

In some implementations, the payment interface that is provided by the marketplace apparatus 155 may be accessed by the user at a secure network location that is referenced by a URL. The URL may be formatted to include data identifying a referring webpage from which the user navigated to the payment interface. For example, the URL that directs a user to the payment interface may be https://www.example-paymentinterface.com/~id1234/PartnerA.com, where "id1234" is a unique identifier for Partner A, and PartnerA.com is the domain address for Partner A's website.

Fantasy sports system 105 may also make use of advertisements 160 based on user actions on the website. As a user makes search queries 145 and receives search results 150, the user's activities may be represented in the search index 140 with a session identifier. This session identifier may be the user's Internet Protocol (IP) address, unique browser identifier, or any other similar identifier. Based on the user's interactions and intent, the system 105 may display advertisements 160 from advertisers 125 that target the user's interactions. For example, if a user searches for baseball matches in the United States, and more specifically in the Midwest region, system 105 may generate and present advertisements 160 related to Midwest-region baseball teams, offers, games, and the like to the user. The determination of relevance based on the user's interactions may also be based upon historical data stored in the advertisement data store 165 and/or user information that may be stored, for example, in system data 180.

In some implementations, the advertisement data store 165 may also store user interaction data specifying user interactions with presented advertisements (or other content items). For example, when an advertisement is presented to the user, data may be stored in the advertisement data store 165 representing the advertisement impression. Further, in some implementations, the data may be stored in response to a request for the advertisement that is presented. For example, the ad request may include data identifying a particular cookie, such that data identifying the cookie may be stored in association with data that identifies the advertisement(s) 160 that was or were presented in response to the request.

When a user selects—for example, clicks or touches—a presented advertisement, data may be stored in the advertisement data store 165 representing the user selection of the advertisement. In some implementations, the data may be stored in response to a request for a webpage that is linked to by the advertisement. For example, the user selection of the advertisement may initiate a request for presentation of a webpage that is provided by (or for) the advertiser. The request may include data identifying the particular cookie for the user device, and this data may be stored, for example, in the advertisement data store 165 and/or system data store 180. Additionally, if an advertiser has opted-in to have click-through traffic tracked, when a user performs an action that the user has defined as a click-through, data representing the click-through may be provided to fantasy sports system 105 and/or stored in the advertisement data store 165 (and/or other data stores).

In some implementations, user interaction data that are stored in the advertisement data store 165 may be anonymized to protect the identity of the user with which the user interaction data is associated. For example, user identifiers may be removed from the user interaction data. Alternatively, the user interaction data may be associated with a hash value of the user identifier to anonymize the user identifier. In some implementations, user interaction data are only stored for users that opt-in to having user interaction data stored. For example, a user may be provided an opt-in/opt-out user interface that allows the user to specify whether they approve storage of data representing their interactions with content.

When fantasy sports system 105 and the search system 135 are operated by a same entity, user interaction data may be obtained by fantasy sports system 105 in a manner similar to that described above. For example, a cookie may be placed on the user device by the search system 135, and the user interactions may be provided to fantasy sports system 105 using the cookie.

When fantasy sports system 105 and the search system 135 are operated by different entities that may not share user interaction data as described above, fantasy sports system 105 may utilize other data collection techniques to obtain user interaction data. For example, fantasy sports system 105 may obtain user interaction data from users that have agreed to have interactions tracked—that is, he or she opted-in. Users may opt-in, for example, to increase the relevance of content items and other information that are provided to the users, or to obtain a specified benefit such as use of an application or to obtain discounts for other services. As described above, the user interaction data obtained from these users may also be anonymized in order to protect the privacy of the users that opt-in. This user interaction data may also be stored in the advertisement data store 165 (and/or other data stores).

Fantasy sports system 105 may use measures of click-through—or another targeted-user interaction—to determine effectiveness measures for content items that are provided to users. For example, effectiveness of a particular content item typically may be considered to be directly proportional to the portion of all users that interacted with the content item and that are resulting in click-through impressions. These measures of click-through may be used, for example, to adjust content selection algorithms to increase effectiveness of content items that are provided to users. For example, several different consent selection algorithms may be used to select content and click-through rates for each of the algorithms, which may then be compared to determine which algorithm(s) are providing more effective content items— that is, content items having higher effectiveness measures.

As noted above, click-through data may not be available for some content items—for example, because the advertiser has not opted-in to click-through tracking—and click-throughs may not be uniformly defined across all advertisers. Therefore, it may be difficult to evaluate effectiveness of content items by relying only on click-through data. However, predictive interactions may be used to evaluate content item effectiveness, as described in more detail below.

The environment 100 may also include an interaction apparatus 170 that selects predictive interactions with which content item effectiveness may be evaluated. The interaction apparatus 170 may be a data processing apparatus that analyzes target interaction data and prior interaction data, for example stored in an interaction data store 175, to identify those prior interactions that are performed, with at least a threshold likelihood, by users prior to performance of the target interaction. For example, the interaction apparatus 170 may determine that users searching for a certain type of frequently mis typed product—for example, "baskitball"— meant to search for a different term—such as "basketball." If the interaction apparatus 170 may determine that a threshold portion of all users committed this error, it may suggest or redirect to the correct search by default as a predictive interaction for the search.

In some implementations, the interaction apparatus 170 may also determine that the portion of all users that performed a predictive interaction, but did not perform the target interaction. The interaction apparatus 170 may use this determination as an indication of the false positive rate that may occur using the predictive interaction as a proxy for the target interaction.

Once the interaction apparatus 170 selects the predictive interactions, the interaction apparatus 170 determines whether additional user interaction data include predictive interaction data. The additional user interaction data may be user interaction data that do not include target interaction data. For example, the additional user interaction data may be user interaction data for user interactions with a website for which click-throughs are not tracked. When the interaction apparatus 170 determines that the additional user interaction data include the predictive interaction data, the user from which the user interaction data was received may be considered a click-through user for purposes of determining content item effectiveness.

In some implementations, the interaction apparatus 170 may assign each click-through user a weight that represents the relative importance of the click-through user's interactions for computing content item effectiveness. For example, a user that performs many different predictive interactions may have a higher weight than a user that performs only one predictive interaction. In some implementations, the interaction apparatus 170 may assign a same weight—that is, 1.0—to each click-through user. This concept may be used to more accurately correlate and suggest content to users. For example, if a user typically interacts with results corresponding to new entity or service proposals, then the system 105 may weight results of new entity or services above older entities. Additionally, the system 105 may give greater weight to a user that more closely correlates to another user. For example, if one user typically interacts or searches for football teams in a similar fashion to the way in which another user typically interacts or searches, then the searches or interactions of one user may be suggested to the other in certain circumstances. Other correlation methods may also be used, such as cosine similarity measures, clustering techniques, or any other similar technique.

Further, in some implementations, the interaction apparatus 170 may be used to determine a similarity weight to other users, which is a value representing an objective similarity between a first user and a second user based on a multitude of factors including, but not limited to, number of shared product categories, frequency of interaction with system, etc. For example, if User A shares five interest in common with User B but shares ten interests in common with User C, then User A may be assigned a higher similarity weight with User C than with User B.

In some implementations, the factors affecting the similarity weight may be given equal weight, while in other implementations the weight given to each factor may vary based on some subjective or objective weighing scheme. In some implementations, suggestions may be given to a user based on the similarity weight, among many other possible factors. For example, matching a user with another user for some purpose on the system 105 may use the relative similarity weights to rank users higher or lower on lists. Additionally, similarity weights and suggestions may be made based on, but not limited to, the number of entities or services on system 105, the frequency of interaction with system 105, the amount of time spent on site, the quantity and/or quality of roster and/or team picks, etc.

The environment 100 may also include a system data store(s) 180 to receive and record information regarding fantasy sports system 105, website(s) 115, end user devices 120, and/or any other data useful to environment 100. For example, information regarding end user devices 120 and end user identifiers may be stored and analyzed to determine user activity on website(s) 115 and/or system 105.

In some implementations, data that may be stored in the system database(s) 180 may be anonymized to protect the identity of the user with which the user data may be associated. For example, user identifiers may be removed from the user data to provide to third-party clients. Alternatively, the user data may be associated with a hash value of the user identifier to anonymize the user identifier. In some implementations, data are only stored for users that opt-in to having their data stored. For example, a user may be provided an opt-in/opt-out user interface that allows the user to specify whether they approve storage of data associated with the user.

While system 105 may operate with only one of each component (e.g., one system 105, one website 115, one end user, one end user device 120, etc.), system 105 may be benefited by multiple of these components (and/or in some instances greatly benefited by a mass amount of said components). For example, the existence and activity of a plurality of users on system 105 may foster greater creativity and flexibility of feedback to system 105 as compared to creative and intellectual stagnation that typically may occur with a small user base. Additionally, features such as game-like interaction of system 105 may be difficult or impossible without at least a small plurality of active competitors on system 105; however, as the number of active users increases, the likelihood of a successful ecosystem for the game-like system 105 features also increases and may tend to lead to greater success of system 105 and user activity (quantity and quality) compared to a small user base.

Figure 2:
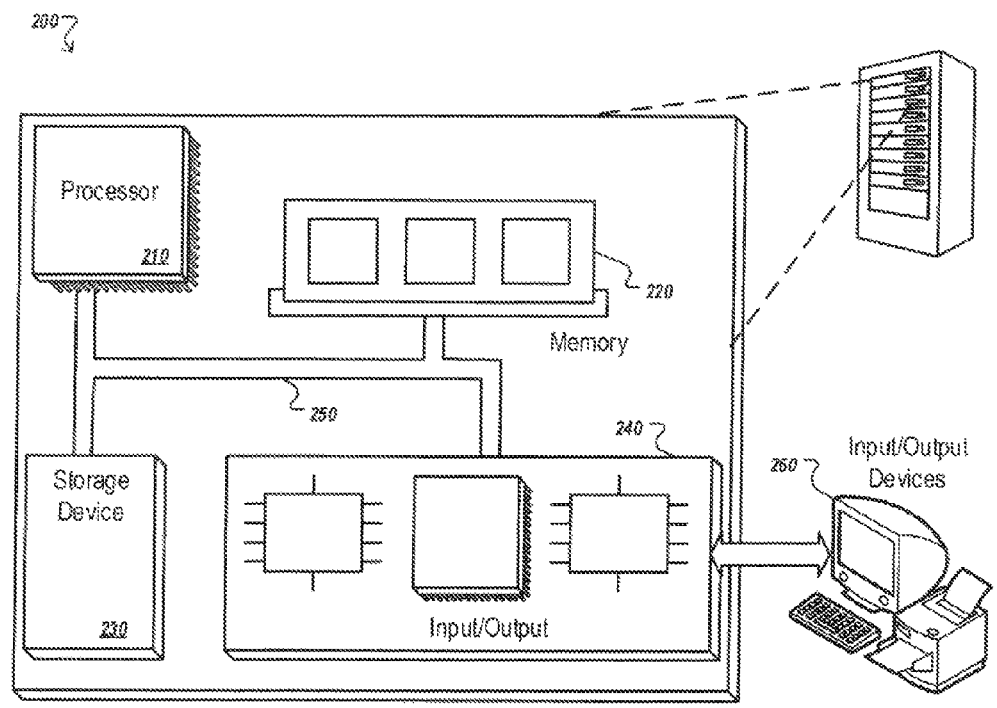
FIG. 2 is a system diagram of an example computer system that may be used to create the fantasy sports system.

FIG. 2 is a block diagram of an example computer system 200 that may be used to provide system 105, as described above. The system 200 typically may include processor(s) 210; memory 220; storage device(s) 230; system input(s)/output(s) 240; system bus(es) 250; and input/output device(s) 260. Each of the components 210, 220, 230, and 240 typically may be interconnected, for example, using system bus(es) 250. Processor(s) 210 may be capable of processing instructions for execution within the system 200. In one implementation, processor(s) 210 may be a single-threaded processor. In another implementation, processor(s) 210 may be a multi-threaded processor. In yet another implementation, processor(s) 210 may be a single-core processor, a multiple-core processor, and/or multiple processors (i.e., more than one socketed processor). Processor(s) 210 typically may be capable of processing instructions stored in the memory 220 and/or on the storage device(s) 230.

Memory 220 stores information within system 200. In one implementation, memory 220 may be a computer-readable medium. In one other implementation, memory 220 may be a volatile memory unit. In another implementation, memory 220 may be a nonvolatile memory unit.

Storage device(s) 230 may be capable of providing mass storage for the system 200. In one implementation, storage device(s) 230 may be a computer-readable medium. In various different implementations, storage device(s) 230 may include, for example, a hard disk device, a solid-state disk device, an optical disk device, and/or some other large capacity storage device.

System input(s)/output(s) 240 provide input/output operations for the system 200. In one implementation, system input(s)/output(s) 240 may include one or more of a network interface devices, for example an Ethernet card; a serial communication device, for example an RS-232 port; and/or a wireless interface device, for example an IEEE 802.11 card. In another implementation, system input(s)/output(s) 240 may include driver devices configured to receive input data and send output data to other input/output device(s) 260, for example keyboards, printers, display devices, and/or any other input/output device(s) 260. Other implementations, however, may also be used, such as mobile computing devices, mobile communication devices, set-top box television client devices, etc.

Although an example processing system has been described in FIG. 1, implementations of the subject matter and the functional operations described in this specification may be implemented in other types of digital electronic circuitry, or in computer software, firmware, or hardware, including the structures disclosed in this specification and their structural equivalents, or in combinations of one or more of them.

Embodiments of the subject matter and the operations described in this specification may be implemented as a method, in digital electronic circuitry, or in computer software, firmware, or hardware, including the structures disclosed in this specification and their structural equivalents, or in combinations of one or more of them. Embodiments of the subject matter described in this specification may be implemented as one or more computer programs—that is, one or more modules of computer program instructions encoded on computer storage medium for execution by, or to control the operation of, data processing apparatus. Alternatively or in addition, the program instructions may be encoded on an artificially-generated propagated signal, for example a machine-generated electrical, optical, or electromagnetic signal, which may be generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium may not be a propagated signal, a computer storage medium may be a source or destination of computer program instructions encoded in an artificially-generated propagated signal. The computer storage medium may also be, or be included in, one or more separate physical components or media (e.g., multiple CDs, disks, or other storage devices).

The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus may include special purpose logic circuitry, for example an field programmable gate array (FPGA) or an application-specific integrated circuit (ASIC). The apparatus may also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing, and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program can, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example an FPGA or an ASIC.

Processors suitable for the execution of a computer program include, by way of example, both general and special purpose microprocessors, and any one or more processors of any kind of digital computer. Typically, a processor may receive instructions and data from a read-only memory or a random access memory or both. The essential elements of a computer are a processor for performing actions in accordance with instructions and one or more memory devices for storing instructions and data. Typically, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, for example a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, for example erasable programmable read-only memory (EPROM), electrically erasable programmable read-only memory (EEPROM), and/or flash memory devices; magnetic disks, for example internal hard disks or removable disks; magneto-optical disks; and/or compact disk read-only memory (CD-ROM) and digital video disk real-only memory (DVD-ROM) disks. The processor and the memory may be supplemented by, or incorporated in, special purpose logic circuitry.

To provide for interaction with a user, embodiments of the subject matter described in this specification may be implemented on a computer having a display device (e.g., a cathode ray tube (CRT), liquid crystal display (LCD), or organic light-emitting diode (OLED) monitor), for displaying information to the user and a keyboard and a pointing device, e.g., a mouse or a trackball, by which the user may provide input to the computer. These may, for example, be desktop computers, laptop computers, smart TVs, etc. Other mechanisms of input may include portable and or console entertainment systems such as GAME BOY and/or NINTENDO DS ((GAME BOY, GAME BOY COLOR, GAME BOY ADVANCE, NINTENDO DS, NINTENDO 2DS, and NINTENDO 3DS are registered trademarks of Nintendo of America Inc., a Washington corporation, located at 4600 150th Avenue NE, Redmond, Wash. 98052), IPOD (IPOD is a registered trademark of Apple Inc., a California corporation, located at 1 Infinite Loop, Cupertino, Calif. 95014), XBOX (e.g., XBOX, XBOX ONE) (XBOX and XBOX ONE are a registered trademarks of Microsoft, a Washington corporation, located at One Microsoft Way, Redmond, Wash. 98052), PLAYSTATION (e.g., PLAYSTATION, PLAYSTATION 2, PS3, PS4, PLAYSTATION VITA) (PLAYSTATION, PLAYSTATION 2, PS3, PS4, and PLAYSTATION VITA are registered trademarks of Kabushiki Kaisha Sony Computer Entertainment TA, Sony Computer Entertainment Inc., a Japanese corporation, located at 1-7-1 Konan Minato-ku, Tokyo, 108-0075, Japan), OUYA (OUYA is a registered trademark of Ouya Inc., a Delaware corporation, located at 12243 Shetland Lane, Los Angeles, Calif. 90949), WII (e.g., WII, WII U) (WII and WII U are registered trademarks of Nintendo of America Inc., a Washington corporation, located at 4600 150th Avenue NE, Redmond, Wash. 98052), etc.

Other kinds of devices may be used to provide for interaction with a user as well; for example, feedback provided to the user may be any form of sensory feedback, for example visual feedback, auditory feedback, or tactile feedback; and input from the user may be received in any form, including acoustic, speech, or tactile input. In addition, a computer may interact with a user by sending documents to and receiving documents from a device that may be used by the user; for example, by sending webpages to a web browser on a user's client device in response to requests received from the web browser.

Some embodiments of the subject matter described in this specification may be implemented in a computing system 200 that includes a back-end component (e.g., a data server) or that includes a middleware component (e.g., an application server) or that includes a front-end component (e.g., a client computer having a graphical user interface or a Web browser through which a user may interact with an implementation of the subject matter described in this specification) or any combination of one or more such back-end, middleware, or front-end components. The components of the computing system 200 may be interconnected by any form or medium of digital data communication, for example a communication network (e.g., network 110). Examples of communication networks include a local area network (LAN) and a wide area network (WAN), an inter-network (e.g., the Internet), and peer-to-peer networks (e.g., ad-hoc peer-to-peer, direct peer-to-peer, decentralized peer-to-peer, centralized peer-to-peer, etc.).

The computing system 200 may include clients and servers. A client and server are typically remote from each other and typically interact through a communication network. The relationship of client and server arises by virtue of computer programs running on the respective computers and having a client-server relationship to each other. In some embodiments, a server transmits data (e.g., an HTML webpage) to a client device (e.g., for purposes of displaying data to and receiving user input from a user interacting with the client device). Data generated at the client device (e.g., a result of the user interaction) may be received from the client device at the server.

Figure 3:
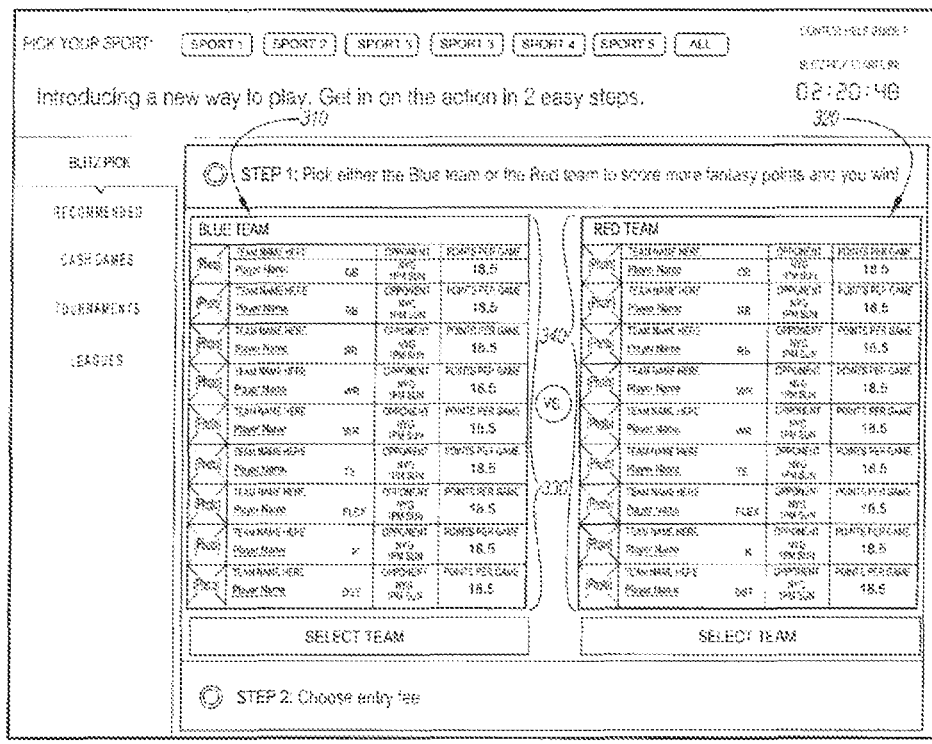
FIG. 3 depicts a screenshot of the fantasy sports system during a roster picking stage.

FIG. 3 depicts a screenshot of the fantasy sports system 105 during a roster picking stage. Roster selection screen 300 may allow a user to select from two or more teams (e.g., first team selection 310 (depicted as "Blue Team") and second team selection 320 (depicted as "Red Team"). These teams typically may be preselected by system 105 operators, system 105 members (i.e., users), algorithms, and/or any similar selection mechanisms.

Typically, each team may include the number of players that comprise a typical team of that sporting event. In some implementations, this number may vary greater or lesser depending upon league, event, and/or like deviations. Further, rosters typically may include players from at least four teams from two separate real-life games; however, this may vary depending on desired fantasy league and match parameters.

Typically, each team roster may contain the same and/or similar fantasy score statistics in the aggregate. For example, first team selection 310 may include a first player list 330 including player A (thirty fantasy points), player B (twenty-five fantasy points), player C (twenty fantasy points), player D (fifteen fantasy points), and player E (ten fantasy points), for an aggregate team fantasy score of one hundred fantasy points. Meanwhile, second team 320 may include a second player list 340 may include player Z (thirty fantasy points), player Y (twenty-five fantasy points), player X (twenty fantasy points), player W (fifteen fantasy points), and player V (ten fantasy points), for an aggregate team fantasy score of one hundred fantasy points. Thus, both teams may be on a statistically even playing field and it remains up to the fantasy competition participants to select the winning team based on their personal knowledge, historical competition knowledge, and/or prediction skill.

Figure 4:
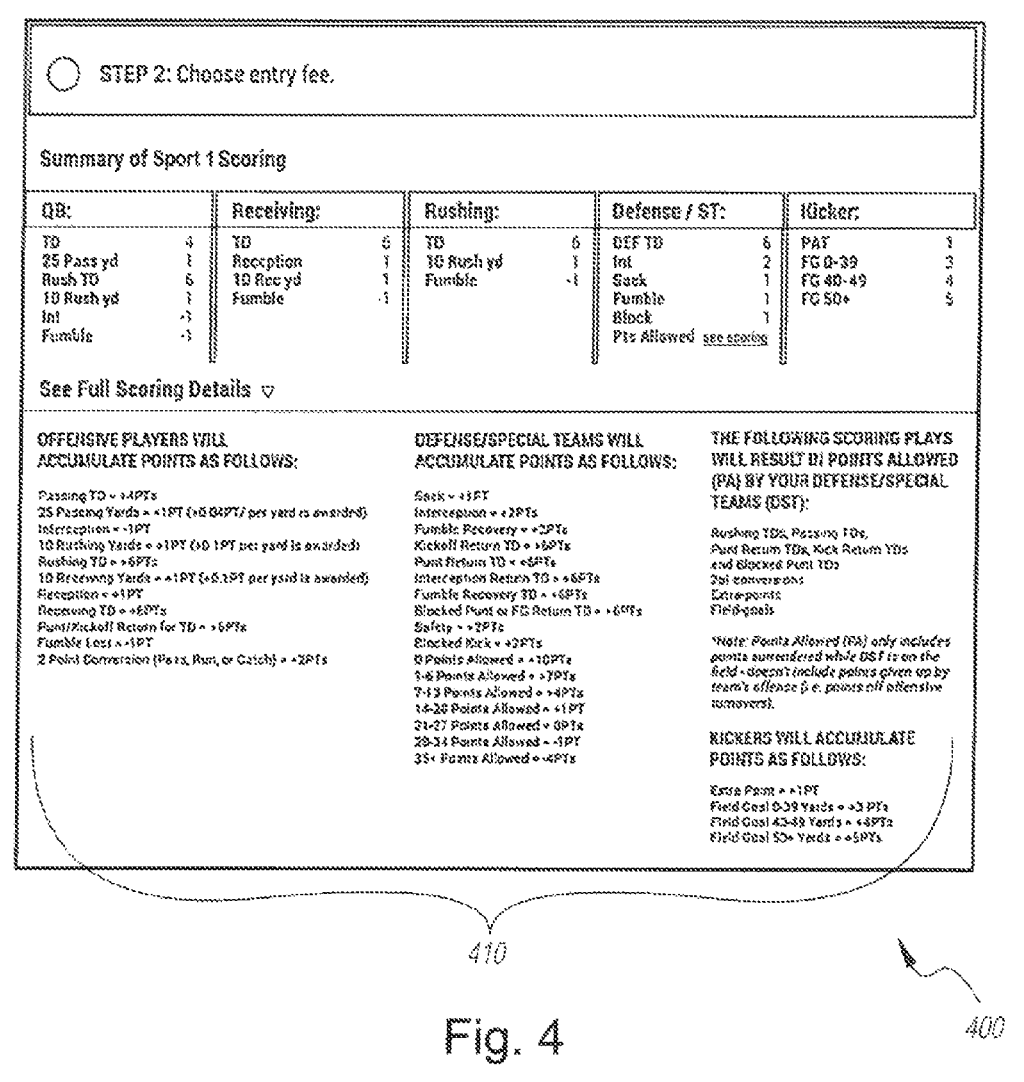

FIG. 4 depicts a screenshot of the fantasy sports system 105 including an example scoring structure dialog 400 for a fantasy competition. Example scoring structure dialog 400 typically may include scoring structure 410 defining the manner in which a fantasy game will be scored based on the real-life game statistics. For example, FIG. 4 depicts a scoring scheme for a National Football League (NFL (NFL is a registered service mark of the National Football League Association, a New York association, located at 345 Park Ave., New York, N.Y. 10154)) competition. Game statistics may be recorded, analyzed, and turned into fantasy scoring points according to such a scheme, ultimately translating to points for the fantasy match in which users may participate. Game statistics may be collected from an external source (e.g., one or more websites 115, resources 130, third-party game statistic data stores, and/or the like) by parsing that external source (e.g., with a scraper, spider, API, module, etc.) and/or the system 105 may maintain, store, and/or process such information (e.g., by crowdsourcing, monitoring real-time game statistics, etc.).

In some implementations, the real-time game statistics may be collected and processed immediately (e.g., within a second or two of real-time occurrence), within a small delay period (e.g., within about thirty to one-hundred and twenty seconds of real-time occurrence, or any other period), and/or after a more substantial delay (e.g., after about five to thirty minutes of real-time occurrence). Typically, real-time game statistics may populate into daily fantasy sports system 105 within about fifteen to sixty seconds of real-time for the sports competition.

In some further implementations, real-time and/or historical statistics may be collected, stored, and analyzed so as to produce aggregate teams for selection by system 105 users. For example, system 105 may collect and store NFL data for the current and past five seasons with relation to each NFL team and/or competition of record. System 105 may them calculate individual, group, team, league, and/or the like category scores according to one or more scoring rubrics (e.g., scoring structure 410).

In some implementations, scoring rubrics may be static, while in other implementations, scoring rubrics may be dynamic and/or semi-dynamic. For example, a rubric may change based on competitions, trends, predictions, reviews, and/or the like, and system 105 may automatically and/or semi-automatically reanalyze and/or recalculate rankings, aggregate scores, and/or the like for the various categories. These calculations and/or analyses may typically be stored on system 105 (e.g., in system database 180) for recall, modification, and/or the like operations).

In some another example implementation, daily fantasy sports system 105 may base a player's, team's, league's, and/or the like's fantasy sports score on historical, stored real-time sports statistics. For example, based on the past ten games, player A might be expected to score thirty-five fantasy points per game.

Additionally, in some further implementations, daily fantasy sports system 105 may adjust these scoring expectations based on the opponent (e.g., player Z from first team selection 310 being the highest fantasy-scoring player; first team 310 including four players from the highest ranked real-world team, etc.) in the fantasy sports competition. For example, player A may be expected to score only thirty fantasy points against a strong opponent, whereas player A might conversely be expected to score forty points against a weak opponent. The contrast to this imbalance might be, for example, that the some or all of the other players on a team (e.g., first team 310) are stronger or weaker than the other team's (e.g., second team 320) players, thus maintaining at least a substantially statistically equal aggregate fantasy score for each team in the fantasy sports competition.

In yet further implementations, fantasy scores may be adjusted based on predictive real-world analysis. For example, an expert, algorithm, and/or the like may determine that a player is on an upward trend and adjust that player's expected fantasy score upward accordingly. In another aspect, a home game against a rival may be expected to galvanize a team's motivation to win, adjusting team player's expected fantasy scores upward as a result. In a converse aspect, cold and/or wet play conditions may be predicted to be a detriment to a team used to warm and dry conditions, thus causing the expected fantasy scores for that team's players downward. Additionally, a player's recent injury may cause that player's expected fantasy score to be adjusted downward accordingly. These represent but a few of the myriad real-world factors that may be integrated into fantasy sports system 105's scoring and matching structure.

Typically, the scoring structure 410 used by daily fantasy sports system 105 typically may be unique for each sport (i.e., baseball, basketball, and/or football may all use unique scoring structures). In one implementation of the scoring system used by daily fantasy sports system 105 for a football game (which may, for example, be displayed as example scoring structure dialog 400), the scoring system may be as follows, as also depicted in FIG. 4:

Actions by Offensive Quarterback:

|  | Points Earned/Lost |
| --- | --- |
| Touchdown | 4 |
| 25 Passing Yards | 1 |
| Rushing Touchdown | 6 |
| 10 Rushing Yards | 1 |
| Interception | −1 |
| Fumble | −1 |

Actions by Offensive Receiving Players:

|  | Points Earned/Lost |
| --- | --- |
| Touchdown | 6 |
| Reception | 1 |
| 10 Receiving Yards | 1 |
| Fumble | −1 |

Actions by Offensive Rushing Players:

|  | Points Earned/Lost |
| --- | --- |
| Touchdown | 6 |
| 10 Rushing Yards | 1 |
| Fumble | −1 |

Actions by Defense/Special Teams:

|  | Points Earned/Lost |
| --- | --- |
| Touchdown | 6 |
| Interception | 2 |
| Sack | 1 |
| Fumble | 1 |
| Block | 1 |

Actions by Kicker:

|  | Points Earned/Lost |
| --- | --- |
| Point After Touchdown | 1 |
| Completed Field Goal at 0-39 Yards | 3 |
| Completed Field Goal at 40-49 Yards | 4 |
| Completed Field Goal at 50+ Yards | 5 |

Figure 5:
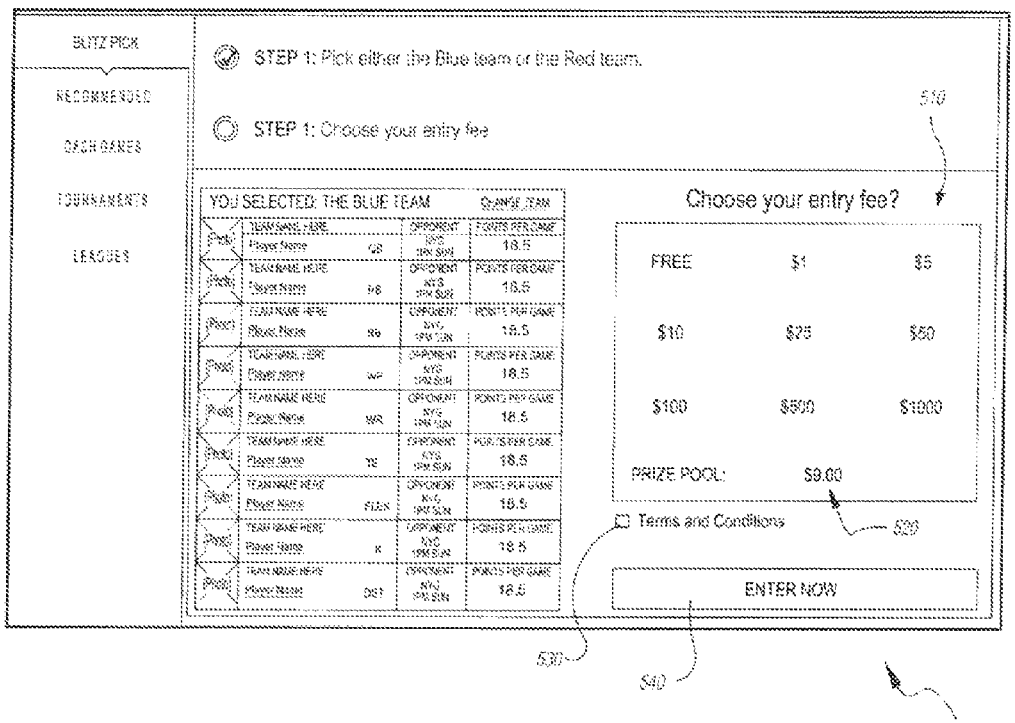
FIG. 5 depicts a screenshot of the fantasy sports system including a selected fantasy team and entry fee selection prompt.

FIG. 5 depicts a screenshot of the fantasy sports system 105 including a selected fantasy team (specifically first team selection 310 from FIG. 3) and an entry fee selection prompt 500. Entry fee selection prompt 500 typically may be presented as a grid 510 of selectable currency values (e.g., FREE, one dollar, five dollars, ten dollars, etc.) that a user may select to indicate their "buy-in" amount for the fantasy match. Depending on the current number of participants in a fantasy competition and the selected entry fees of the aggregate participants, entry fee selection prompt 500 may also display a "Prize Pool" indication 520 with the aggregate pay-out for the winning fantasy competitor. Typically, this aggregate pay-out value 520 may be calculated by summing all entry fees, deducting ten percent from this sum, and then outputting the remainder (e.g.: $5+$5=$10; $10−($10* 0.1)=$9). This formula may, of course, be modified as desired.

In some implementations, users may also need to affirmatively consent for an agreement for using the system 105 to enter a fantasy competition. Such affirmative consent may be provided, for example, tapping or otherwise indicating in a checkbox 530 (located below grid 510 but may be located at any location and/or generated at any location for the user to provide consent). A user may then submit their fantasy competition entry by tapping or otherwise indicating submission (e.g., by tapping the "Enter Now" button 540 on FIG. 5). The system 105 may then receive the user's team selection and entry fee, and then begin the matching process to form a fantasy competition.

Figure 6:
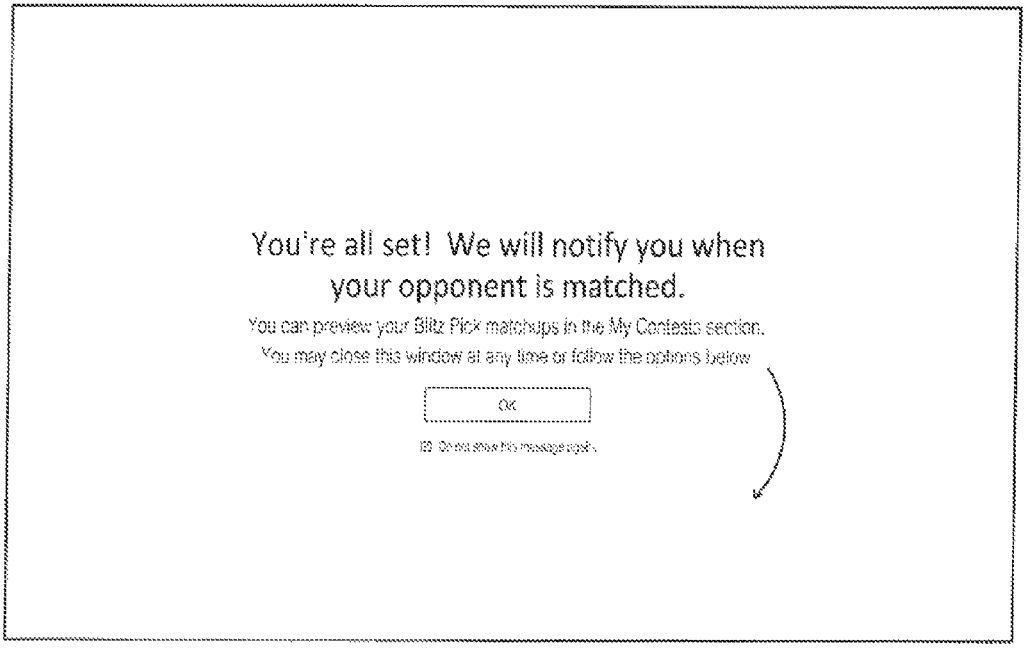
FIG. 6 depicts a screenshot of the fantasy sports system during a confirmation stage.

FIG. 6 depicts a screenshot of the fantasy sports system 105 during a confirmation stage. System 105 typically may generate and/or display to a user a confirmation screen 600, which typically may verify to a user that the user's fantasy competition submission has been sent to system 105 and that system 105 is matching the user's submission with other submissions on system 105.

Figure 8:
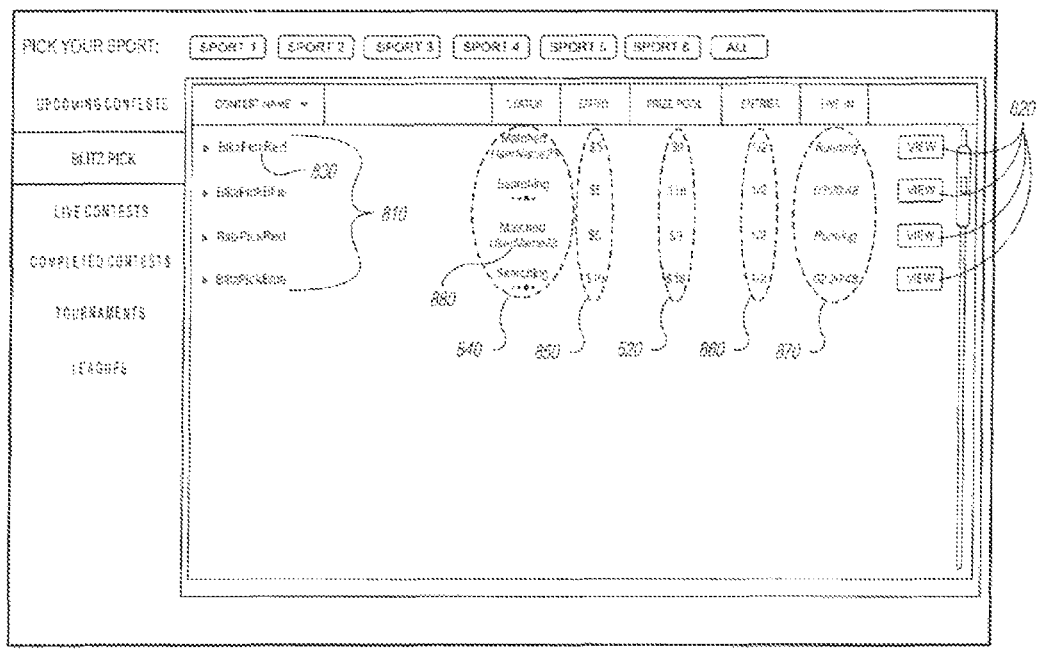
FIG. 8 depicts a screenshot of the fantasy sports system including a fantasy sports competition summary.

In some implementations, confirmation screen 600 may also direct user to an overview screen (e.g., as depicted in FIGS. 8 and/or 14, described below) to view competitions on system 105 and/or the user's fantasy competition submissions and associated progress (e.g., in the My Contests section, also referred to as fantasy sports competition summary 800, described below).

Figure 7:
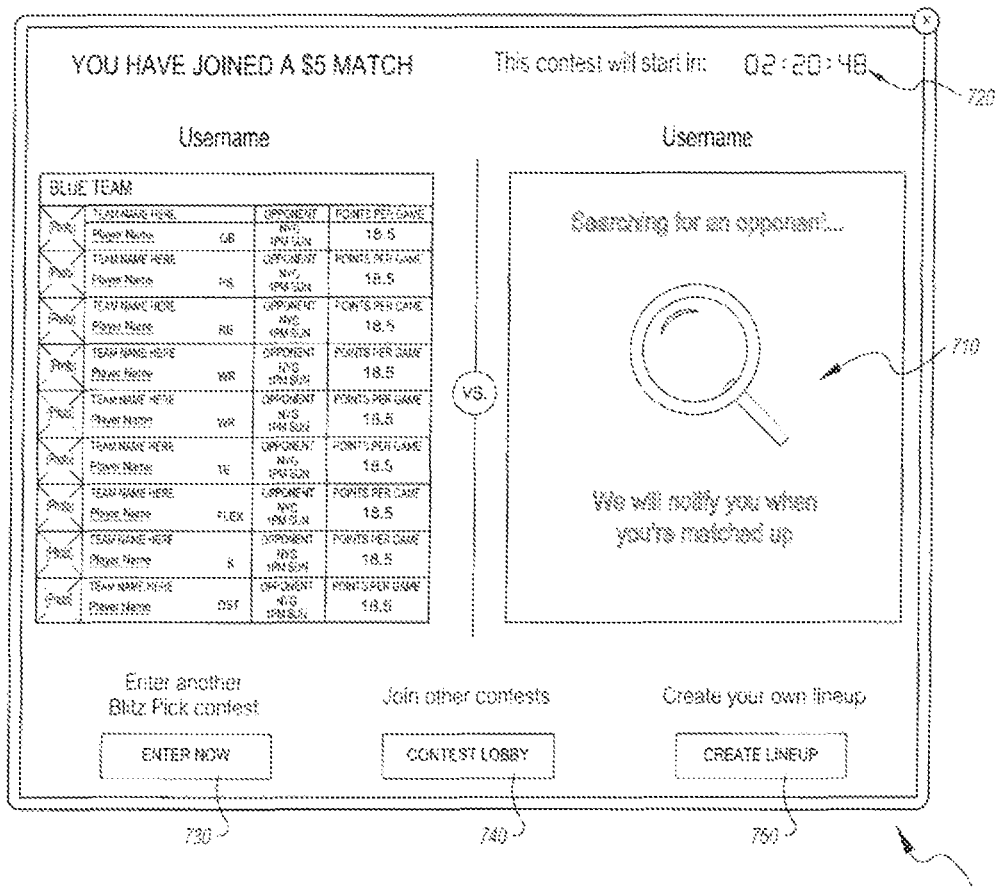
FIG. 7 depicts a screenshot of the fantasy sports system during a matching stage.

FIG. 7 depicts a screenshot of the fantasy sports system 105 during a matching stage. System 105 typically may generate and display to a user their selected team (e.g., first team selection 310, as depicted) and the selected team of their competitor on a match display 700. In some implementations, where a user has not been match with an opponent, match display 700 may display system 105 is searching for an opponent with a searching dialog 710.

In other implementations, match display 700 may display a countdown timer 720 in which a match may occur (i.e., before the real-life sporting events begin), links to other aspects of system 105 (e.g., "Enter another Blitz Pick contest" 730, "Join other Contests" 740, and/or "Create your own lineup" 750). A user may tap on or otherwise select these links (or associated figures, such as icons) to browse to these system 105 components.

FIG. 8 depicts a screenshot of the fantasy sports system including a fantasy sports competition summary 800. Fantasy sports competition summary 800 typically may display competition lists 810, which may typically summarize one or more fantasy sports contests 820 (also referred to as fantasy sports competitions) that can be entered into ("Upcoming Contests" side tab), contests 820 currently entered into by user (typically depicted as "Blitz Pick" contests and/or current contests side tabs), competitions 820 wherein the corresponding real-life sporting events are ongoing ("Live Contests" side tab), and completed competitions 820 ("Completed Contests" side tab).

Each subsection may display one or more lists 810 containing, for example, the name 830 of the contest 820, the current status 840 of the contest 820 (e.g., match against another user, searching for a match, etc.), the buy-in entry fee 850, the aggregate prize pool 520, the number of entries into each contest 860, the current real-life status 870 (e.g., time to start of game, when game completed, game currently active, etc.), and/or matched opponents 880. In some implementations, a user may view each contest in greater detail by selecting a link and/or indicator to expand to an expanded context panel 900.

Figure 9:
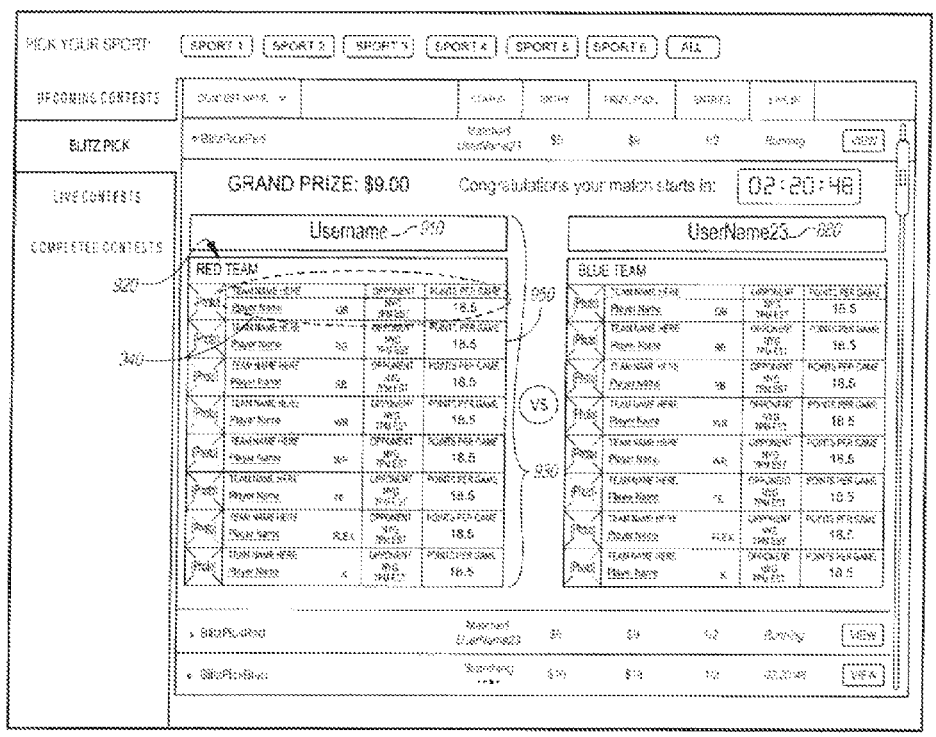
FIG. 9 depicts a screenshot of the fantasy sports system including an expanded panel of the fantasy sports competition summary.

FIG. 9 depicts a screenshot of the fantasy sports system including an expanded panel 900 from fantasy sports competition summary 800. Expanded panel 900 typically may display (in addition to the information displayed on fantasy sports competition summary 800) each user 910, each fantasy team selection 920, the roster 930 of each fantasy team selection 920, and statistics 940 of each player 950 on the fantasy team roster 930.

Typically, system 105 users may reference expanded panel 900 to review contest entries that he or she has made; watch real-time and/or semi-real-time updates of scoring for the contest 820; review progress of a team selection 920 roster 930; and/or the like. For example, a user 910 may review his team selection 920 roster 930, see which player 950 on his team selection 920 is most likely to be pivotal in the upcoming contest 820, and track the progress of that player 950 closely. Alternatively, the user 910 may review the competitor 880's roster 930 and players 950 to see whom the user 910 should be concerned about and/or root against. Thus, expanded panel 900 provides a more immersive experience for the user 910 to review and analyze contests 820.

Figure 10:
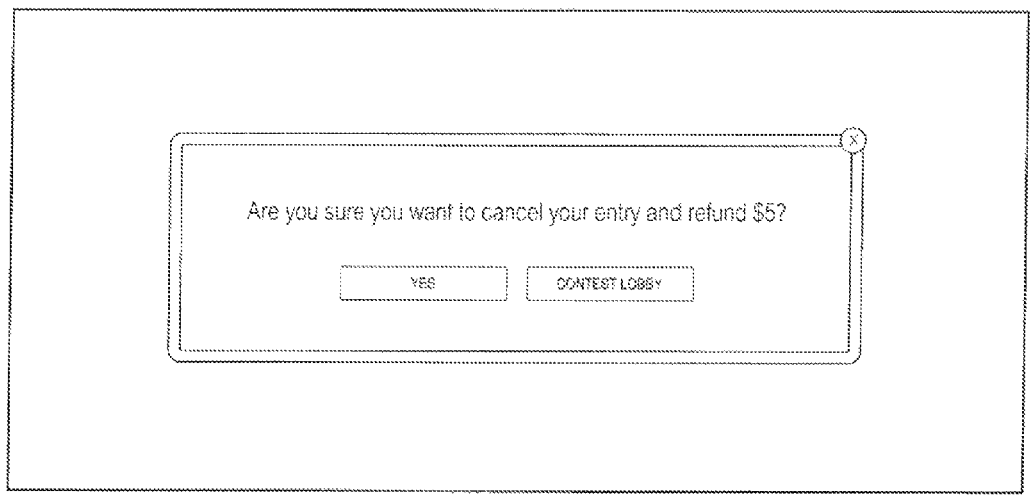
FIG. 10 depicts a screenshot of the fantasy sports system including a cancellation prompt.

FIG. 10 depicts a screenshot of the fantasy sports system 105 including a cancellation prompt 1000. System 105 typically may display cancellation prompt 1000 when a user 910 cancels their entry in a fantasy sports competition 820 (typically before, but in some implementations after, matching with opponent 880) and system 105 confirms the user's cancellation request. System 105 typically may then refund the user's entry buy-in 850, if any is due (e.g., credit the user's account, refund the amount to the user's credit card, dispense currency from a console, etc.).

In some implementations, the refunded amount may be lessened depending on circumstances. For example, where a contest 820 has already started and the user 910 cancels his or her entry, system 105 may refund a percentage of the user's entry fee 850 and/or pay out the retained percentage to the user's opponent 880 (and/or retain some or all for the system 105's percentage).

In further implementations, system 105 may also generate and/or display cancellation prompt 1000 where a user 910 has not been matched with an opponent 880 for a fantasy sports competition 820 and where the real-life sporting event has already begun and/or completed. For example, where user 910 entered a competition 820 but no opponents 880 join the competition 820 prior to the end of the real-life sporting event, system 105 may automatically and/or semi-automatically cancel and/or otherwise reject user's entry into competition 820.

Figure 11:
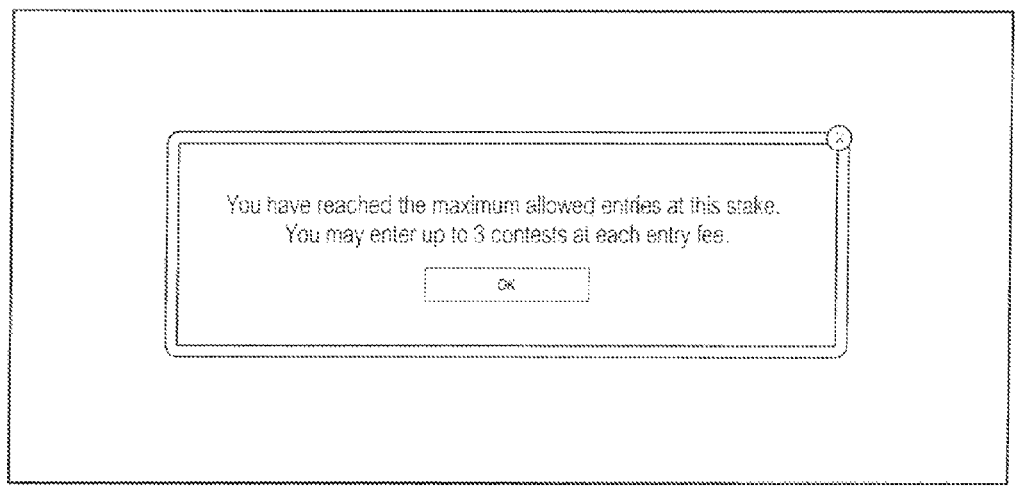
FIG. 11 depicts a screenshot of the fantasy sports system including a maximum entries prompt.

FIG. 11 depicts a screenshot of the fantasy sports system 105 including a maximum entries prompt 1100. Maximum entries prompt 1100 may be generated and/or displayed to a user 910 when the user 910 has reached a maximum number of entries at a given level, for example where more than three entries at a same entry fee 850 have been submitted. For example, if system 105 only allows three entries at the same entry fee 850 (e.g., five dollars, ten dollars, etc.), then the user 910 may need to wait until additional entries at that entry fee 850 are allowed (e.g., after the end of a twenty-four-hour period, after a pending contest at that entry fee is concluded, etc.).

Figure 12A:
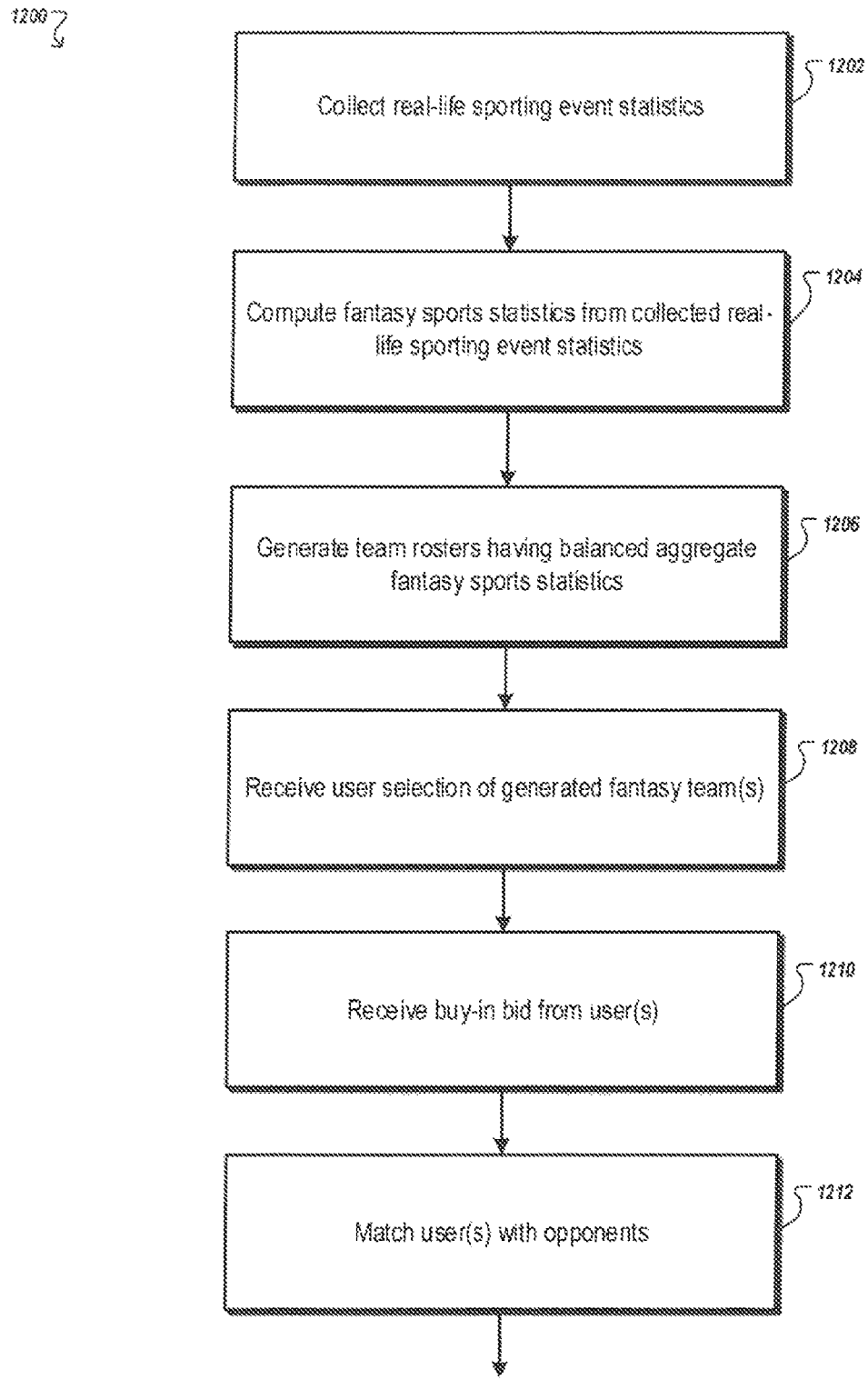
FIG. 12A depicts a first process flowchart associated with the fantasy sports system.
Figure 12B:
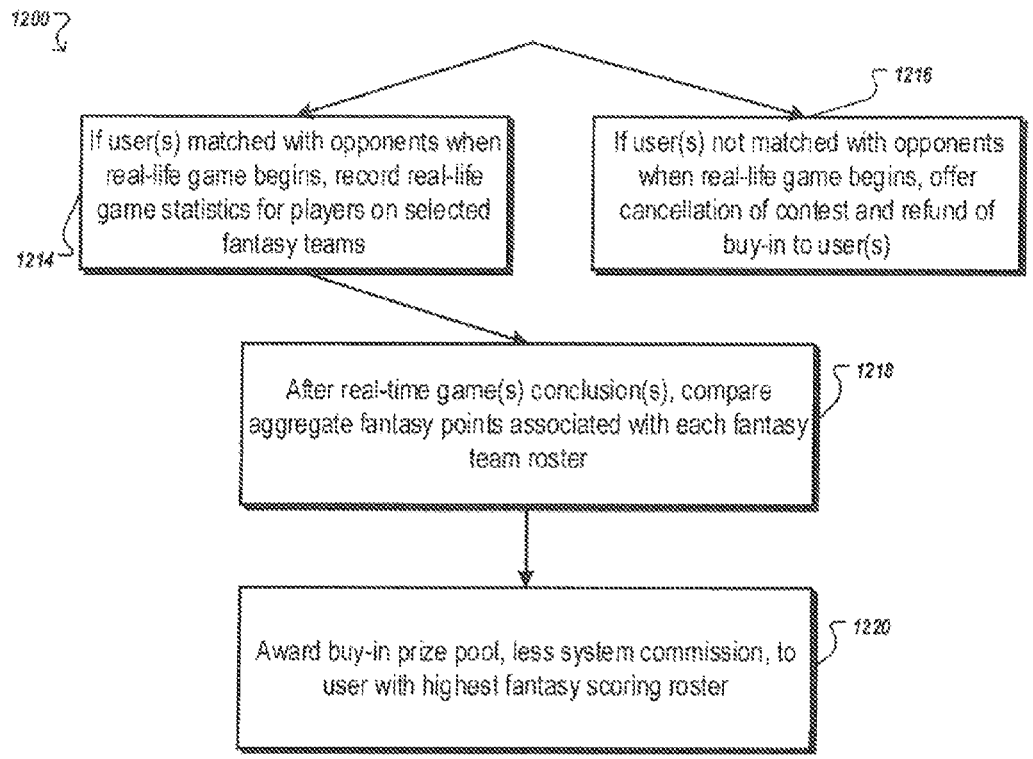
FIG. 12B depicts a second process flowchart associated with the fantasy sports system.

FIGS. 12A-12B depict a system process flowchart 1200 associated with fantasy sports system 105. System process flowchart 1200 typically may include the steps of "Collect real-life sporting event statistics" 1202; "Compute fantasy sports statistics from collected real-life sporting event statistics" 1204; "Generate team rosters having balanced aggregate fantasy sports statistics" 1206; "Receive user selection of generated fantasy team(s)" 1208; "Receive buy-in bid from user(s)" 1210; "Match user(s) with opponents" 1212; "If user(s) matched with opponents when real-life game begins, record real-life game statistics for players on selected fantasy teams" 1214; "If user(s) not matched with opponents when real-life game begins, offer cancellation of contest and refund of buy-in to user(s)" 1216; "After real-time game(s) conclusion(s), compare aggregate fantasy points associated with each fantasy team roster" 1218; and/or "Award buy-in prize pool, less system commission, to user with highest fantasy scoring roster" 1220.

Each of these steps is described in greater detail above in this disclosure. These steps may, in some implementations, be performed cyclically. In other implementations, some of these steps may be skipped and/or deleted without compromising the overall process. For example, if system 105 has already collected real-life sporting event statistics and/or computed fantasy sports statistics, these steps may be skipped and further steps may be initiated.

During "collect real-life sporting event statistics" 1202 step, system 105 typically may query, retrieve, store, and/or otherwise process real-life sporting event statistics. Typically, statistics may be associated with real-time events, but in some implementations, they may be historical statistics. For example, the statistics may be collected daily or hourly, retrieving all the statistics backlogged during that time period. Statistics may typically be retrieved from one or more third-party statistics sources. For example, system 105 may query a football statistics database, a baseball statistics database, an Olympics database, and/or the like. This collected data typically may then be stored on one or more system 105 data stores, described previously, for recall and/or processing.

Further, during "compute fantasy sports statistics from collected real-life sporting event statistics" 1204 step, system 105 may typically query stored and/or real-time data to generate fantasy sports statistical measures. For example, real-life event statistics may be processed according to one or more scoring structures associated with system 105 events, contests, and/or the like. Such a scoring structure 410 is described in detail above. In some implementations, system 105 typically may then store the computed fantasy data in one or more data stores on system 105 for further processing and/or recall.

During "generate team rosters having balanced aggregate fantasy sports statistics" 1206 step, system 105 typically may analyze the stored fantasy measures to generate one or more fantasy rosters having approximately equal real-time statistical data. This process is described in detail above, but typically system 105 may generate aggregate fantasy scores between players of at least two, but typically four, teams playing on the same date based on these players' calculated fantasy scores. Further, these players typically may be from at least two, but typically four, different teams, which often may be playing against each other simultaneously and/or nearly at the same time. In some implementations, further filters and/or settings may be in place, such as real-world salaries, real-world data time windows, and/or the like.

Additionally, during "receive user selection of generated fantasy team(s)" 1208 step, system 105 typically may receive from a user's input a selection of one or more fantasy teams generated by system 105. For example, system 105 may generate first team selection 310 and second team selection 320, system 105 may present both team selection options to a user, and the user may then select whichever presented team he or she believes most likely to win the contest.

In some implementations, system 105 may present only two team selection options, while in other implementations, system 105 may present more than two options for team selections. Further, in some implementations, system 105 may generate one or more team selections having similar, but not exactly alike, player rosters. For example, a first user may be presented with a roster having players A-E as a first team selection 310, while a second user may be presented with a roster having players A-C and E-F. These differing roster presentations may still typically be roughly equal in terms of aggregate fantasy scores; however, such dynamic presentation may prompt additional user interaction, allow for analytics of user choices based on player presentation and/or order, and/or the like.

Next, during "receive buy-in bid from user(s)" 1210, system 105 typically may receive a buy-in amount from the user for the contest. For example, a contest may have a prize of twenty-five dollars for the winner and require a five dollar buy-in for each entrant, of which there may be only two entrants, while in other implementations there may be more than two entrants.

In other implementations, however, there may be no buy-in required for prizes and/or buy-in may be in a non-monetary currency. For example, system 105 may have one or more points, virtual currencies, and/or the like associated with and/or unique to system 105 (e.g., "fantasy bucks"). In some additional implementations, system 105 nonmonetary currencies may be exchanged for system 105 tokens, badges, privileges, tickets, and/or other prizes (real or virtual).

During "match user(s) with opponents" 1212 step, system 105 typically may query for one or more entrants already entered in system 105 contest. For example, user A may have selected first team selection 310 and user B's later selection of second team selection 320 may trigger system 105 to associate user A and user B as opponents for the contest between first team selection 310 and second team selection 320.

In some implementations, system 105 may incentivize participation in one or more contests waiting for more entrants. For example, system 105 may increase prize values temporarily, decrease buy-in values, present rosters with slightly elevated aggregate fantasy scores, and/or like mechanisms to prompt other users to join the contest. Such mechanisms may tend to promote increased fill rates for contests, decreased refunds for solo-entrant contests, and/or the like.

Additionally, during "if user(s) matched with opponents when real-life game begins, record real-life game statistics for players on selected fantasy teams" 1214 step, system 105 typically may begin contest in time with commencement of one or more real-life games. Typically, this time of commencement may be depicted with a clock or other mechanism (e.g., countdown timer 720). System 105 may then query, receive, and/or record real-time statistics from the real-life games to calculate fantasy scores for the instant contest according to one or more scoring structures 410.

Conversely, during "if user(s) not matched with opponents when real-life game begins, offer cancellation of contest and refund of buy-in to user(s)" 1216, system 105 typically may cancel the contest entered into by the user and refund the buy-in to that user as well. This may occur, for example, when only a single user has entered a contest and/or where an entrant threshold has not been met (e.g., ten entrants out of max two hundred).

Further, during "after real-time game(s) conclusion(s), compare aggregate fantasy points associated with each fantasy team roster" 1218 step, system 105 typically may calculate, analyze, and/or compare aggregate fantasy points derived from the real-time game's real-time data received by system 105. Based on this data aggregate, system 105 may calculate one or more ranking for entrants. For example, if user A's first team selection 310 ended with an aggregate score of one-hundred and twenty points, while user B's second team selection 320 ended with an aggregate score of one-hundred and twenty-two points, system 105 would rank user B as first place and user A as second place.

Figure 15:
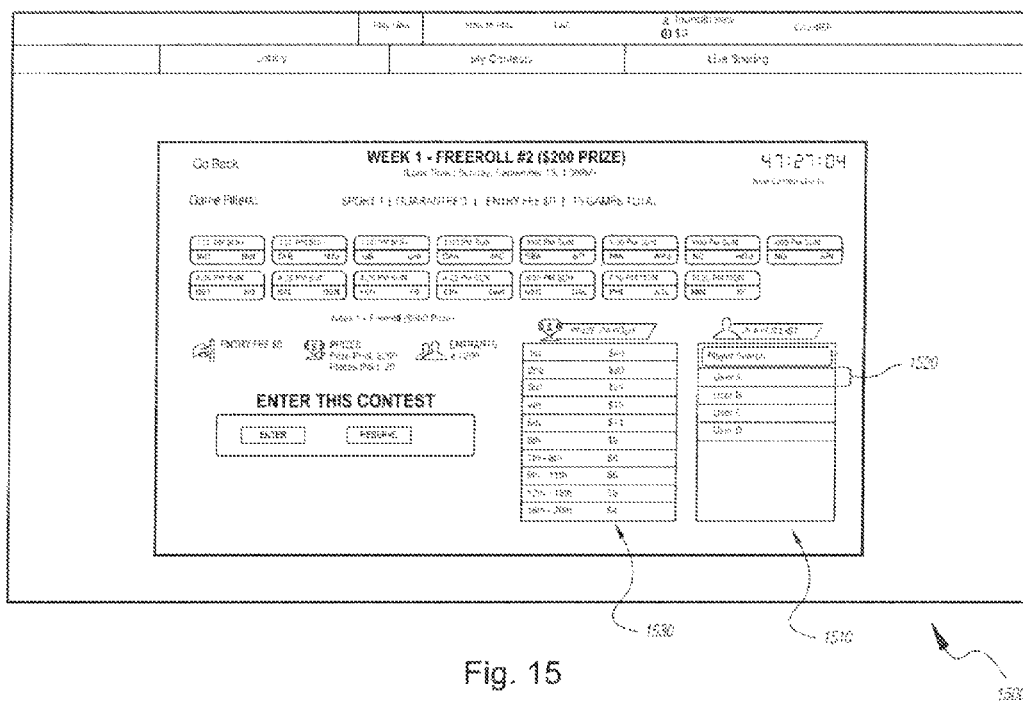
FIG. 15 depicts a screenshot of the competitive analysis view embodiment of the fantasy sports system including a detailed competition view.

During, "award buy-in prize pool, less system commission, to user with highest fantasy scoring roster" 1220 step, system 105 typically may award some or the entire prize to the first place user from the 1218 step, above. In some implementations, system 105 may also take a percentage of the total prize pool, described above. Further, in some other implementations, a prize schedule may be followed for prize distributions (for example, as seen in FIG. 15, below). A prize schedule may, for example, be beneficial for awarding a larger subset of entrants in contests with many entrants and/or a larger prize pool.

FIGS. 13-19 depict another embodiment of system 105 and associated flowcharts including a competitive analysis view(s). Typically, as depicted in FIGS. 13A-13B, competitive analysis view(s) 1300 include a competitive analysis window(s) 1310, selected user identifier(s) 1320, selected user 1330; competition ranking(s) 1340, ranking trend(s) 1350, ranking differential(s) 1360, ranking descriptions 1370 (e.g., expected to score X more points in game, underperforming by X points this game, etc.) and/or the like. Typically, competitive analysis view(s) 1300 allow a system 105 user 910 to determine the comparative effect of other activities' effect upon that user's standing, scoring, and/or the like.

In one such implementation, system 105 may identify one or more selections (e.g., athletes, players, draft picks, and/or the like) that users may select within system 105. System 105 may then determine, compared to the rest of users' picks within one or more competitions 820, what effect that specific selection's actions during the competition 820 may have on a particular user's score, rank, and/or the like.

For example, in a relatively simple scenario depicted in FIGS. 13A-B, a user 910 may select to have player A on his team for a competition 820. Out of the other five hundred users in the competition 820, half (two-hundred and fifty-five) may select player B, a quarter (one-hundred and twenty-five) may also select player A, a tenth (fifty) may select player C, and the rest may select players D-H evenly (i.e., fifteen to each respective player). Thus, it would be to the user's benefit to "root for" players that will gain his collective opponents in the competition 820 the least points. In this case, the user 910 would want to root for players D-H, as only fifteen users would receive points for each respective action. Alternatively, it would be to the user's benefit to "root against" players that will gain his collective opponents the most points. In this case, the user 910 would want to root against player B, as half of his competitors would receive points for player B's actions.

In some further implementations, system 105 may also consider additional factors for comparison and/or presentation to a user 910. For example, using the above-described competition 820, system 105 may identify how many times a single user 910 has selected a particular player (e.g., player A, player B, etc.) in competitions 820, statistical data (e.g., how often a player B has beaten an opposing team; how well a player/team performs at the beginning, middle, and/or end of a game; a player/team's trend during a season and/or a subset thereof; and/or the like), recent real-world events (e.g., how player B performs in rain, injuries, game ball inflation, and/or the like), quantity and/or volume of bets toward/against player(s), and/or the like.

In one example, where a user 910 may have multiple competition entries, multiple entries into different competitions, and/or the like, system 105 may identify these disparate entries and/or selections to determine and/or display an aggregate comparison. Thus, where a user 910 may have entered into multiple competitions 820 with different sports, system 105 may determine that basketball player X should be rooted for by the user 910 while football player Y should be rooted against by the user 910. In another example, where a user 910 enters into multiple competitions 820 for the same sport, while selecting one or more similar players (e.g., player A) in one or more of those competitions 820, system 105 may identify and/or compare the relative and/or weighted impact of these repeated selections (along with the selections of other system 105 users 910) to display to the user 910. Thus, a user 910 may not be limited to one competition entry, one player selection, one sporting category, and/or the like.

In still further implementations, presentation of other users on system 105 may be prioritized based on these users' relative effect on a selected user 1330's performance. For example, where system 105 identifies, calculates, and/or displays that another system 105 user is approaching a selected user 1330's current rank in one or more competitions 820, and/or where the selected user 1330 is approaching another user's rank in one or more competitions 820, system 105 may generate and/or display these rankings hierarchically.

For example, in some implementations, system 105 may depict players and/or other users 910 to root against, either due to the potential to surpass that user's rank and/or to avoid being surpassed by that user 910. Such a hierarchy may be a standardized numerical ranking (e.g., where the top-ranked users 910 coincide with values closest to one, while the worst-ranked users 910 have values approaching n−1); alphabetically (e.g., User A listed before User B, along with respective scores and/or ranks); trends (e.g., static users 910 give value of, for example, zero, downward trending (e.g., losing points) users 910 given negative values, and/or upward trending (e.g., gaining points) users 910 given positive values, wherein the magnitude of values is greater when the rate of change of the user's point change is greater); categorically (e.g., users 910 above selected user 1330, users below selected user 1330, etc.), and/or the like.

In some implementations, calculation and ranking of other users relative to a selected user 1330 may be performed in real-time with a competition 820. For example, system 105 may monitor, store, analyze, and/or generate comparative displays for one or more users while one or more competition progresses. In this fashion, a user may dynamically be kept abreast of his or her current rank within one or more competitions 820. This may be done continually (e.g., by responding to push-pull commands and/or through an API, as discussed elsewhere in this application), periodically (e.g., polling every X amount of time), and/or the like. These processes may also be performed automatically, semi-automatically, and/or manually.

In other implementations, calculation and ranking of other users relative to a selected user 1330 may be performed prior to a competition 820 in prediction of one or more outcomes and/or events during the competition 820. For example, where football player A is expected to score at least three touchdowns, while football player B is expected to score only two touchdowns, system 105 may anticipate and/or bias scoring and/or comparative display(s) to rank player B as less of a threat (i.e., less reason for a selected user 1330 that did not pick player B to root against player B). Additionally, system 105 may rank users that selected player B lower relative to users that select player A. System 105 may then aggregate one or more of these predictions to calculate and/or generate aggregate, predictive rankings.

In still further implementations, such aggregate, predictive rankings may also be supplemented with real-time calculations. For example, system 105 may use predictive rankings as a base line and then modify these rankings based on real-world, real-time data from ongoing competitions 820. In some implementations, system 105 may weight this modification of rankings based on various factors, such as the typical point at which predictive rankings and real-time rankings tend to closely track, the amount of the competition 820 played, the amount of time left to place bets, and/or the like. Various methodologies may be used in exemplary embodiments, and optionally additional databases may be created to supplement and/or aggregate predictive data and tools. Any particular methodology used for individual predictions of fantasy scoring may be utilized in the various embodiments, and various predictive values may be aggregated, accumulated and stored in additional predictive databases to facilitate the implementation of predictive rankings.

Figure 14:
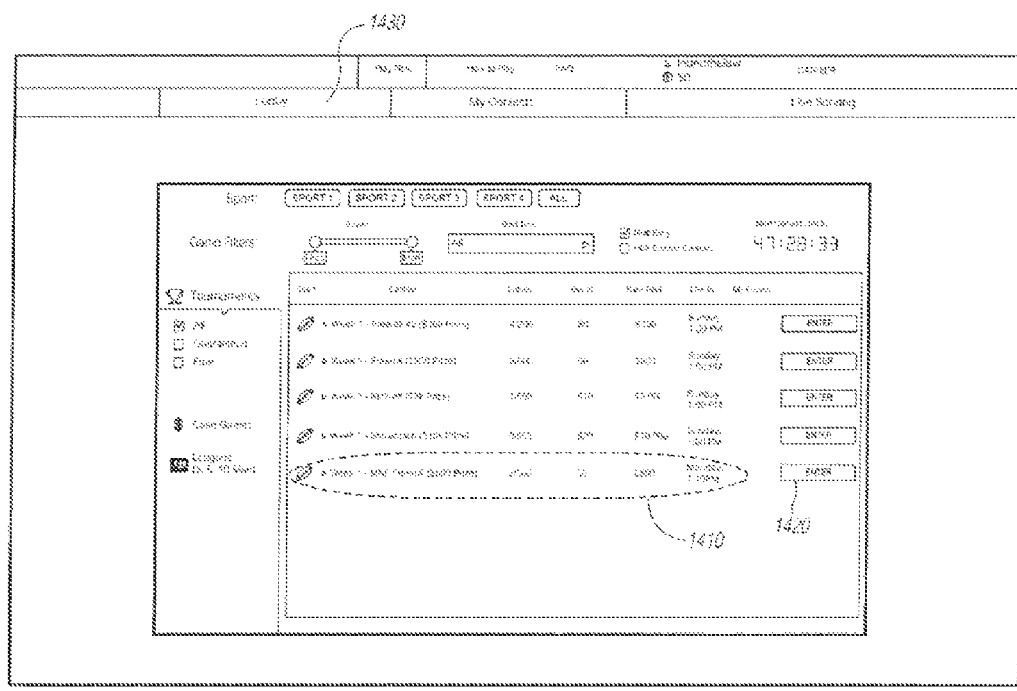
FIG. 14 depicts a screenshot of the competitive analysis view embodiment of the fantasy sports system displaying a lobby tab view.

FIGS. 14-17 depict various views of system 105 associated with the comparative analysis embodiment. FIG. 14 depicts a screenshot of the competitive analysis view 1300 embodiment of the fantasy sports system 105 displaying a lobby tab view 1400. Typically, lobby tab view 1400 depicts past, present, and/or future competitions 820, details 1410 about those competitions 820, links 1420 to join these competitions 820, and/or the like. A viewer typically may enter lobby tab view 1400 by selecting the "Lobby" tab 1430 from the system 105 interface, and then typically may review, select, and/or analyze competitions 820 on the lobby tab view 1400.

FIG. 15 depicts a screenshot of the competitive analysis view 1300 embodiment of the fantasy sports system 105 including a detailed competition view 1500. Typically, detailed competition view 1500 may be accessed by selecting a past, present, and/or future competition 820 from system 105 interface (e.g., from lobby tab view 1400). Detailed competition view 1500 typically may depict information including contests 820, entry fee 850, prizes 520, entrant list 1510, entrants 1520, prize schedule 1530, countdown timer 720 to the competition 820, and/or the like. A viewer typically may get a better idea of the competition 820 specifics and those involved by viewing detailed competition view 1500. Optionally, further information may be displayed from further predictive databases to provide users with more information upon which to base decisions.

Figure 16:
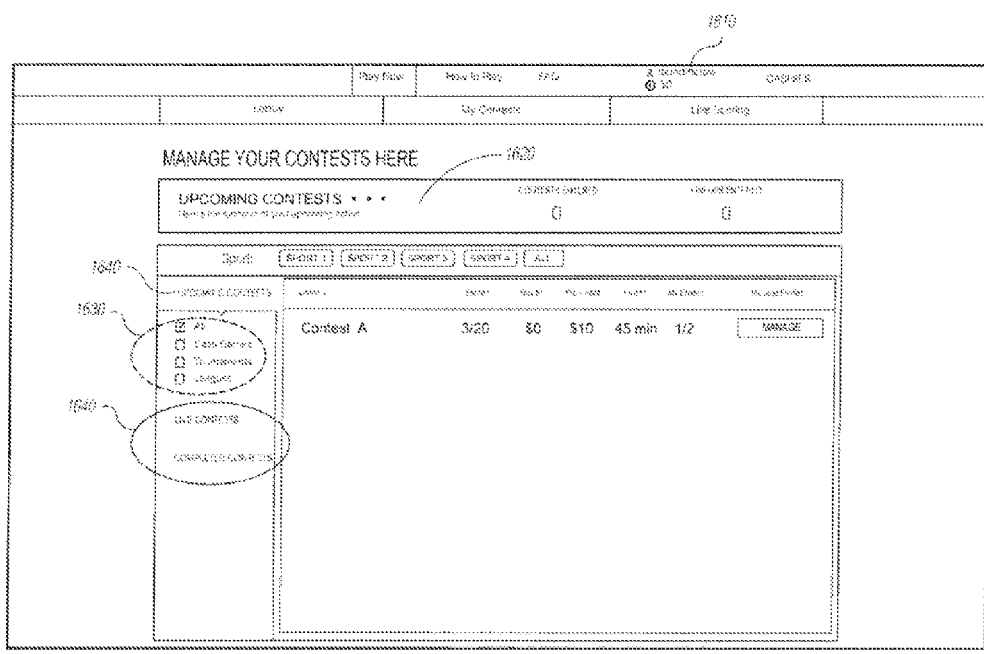
FIG. 16 depicts a screenshot of the competitive analysis view embodiment of the fantasy sports system including a My Contests tab view.

FIG. 16 depicts a screenshot of the competitive analysis view 1300 embodiment of the fantasy sports system 105 including a "My Contests" tab view 1600. My contests tab view 1600 typically may depict contests 820 in which a logged-in user 1610 is involved. This may, as depicted, be broken down into different sports categories 1620, types of contests 1630 (cash, tournament, league, and/or the like), descriptive competition status 1640 (upcoming, live, completed, time, and/or the like), and/or depict data about the user's selected competition entries (e.g., how many entered into, how many lineups submitted, buy in amounts, prize amounts, and/or the like). In some implementations, this may also be sorted and/or ranked by relevance, importance (e.g., prize amount, buy in amount, number of entries, etc.) and/or the like.

Figure 17:
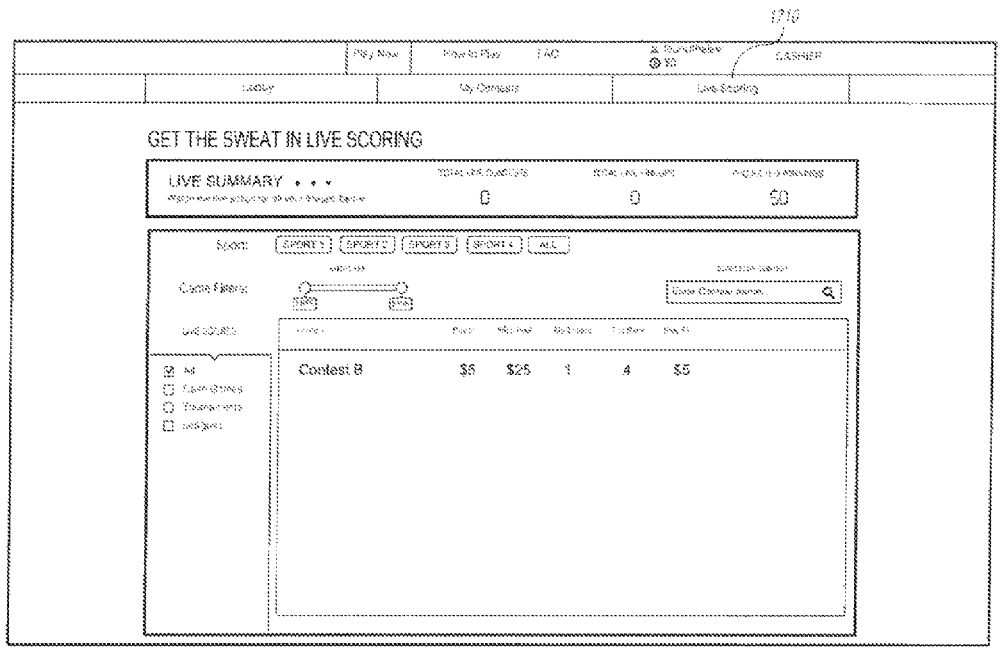
FIG. 17 depicts a screenshot of the competitive analysis view embodiment of the fantasy sports system including a Live Scoring tab view.

FIG. 17 depicts a screenshot of the competitive analysis view 1300 embodiment of the fantasy sports system 105 including a Live Scoring tab view 1700. Live scoring tab view 1700 typically may be accessed by selecting the Live Scoring tab 1710. Live scoring tab view 1700 typically may depict information regarding competitions 820 that are ongoing, how many competitions user is involved with, and what the user is projected to win/lose. This interface may also be sorted, for example but not limited to, by different sports categories 1620, types of contests 1630 (cash, tournament, league, and/or the like), competition status 1640 (upcoming, live, completed, and/or the like), and/or depict data about the user's selected competition entries (e.g., how many entered into, how many lineups submitted, buy in amounts, prize amounts, and/or the like), relevance, importance (e.g., prize amount, buy in amount, number of entries, etc.) and/or the like.

Figure 18:
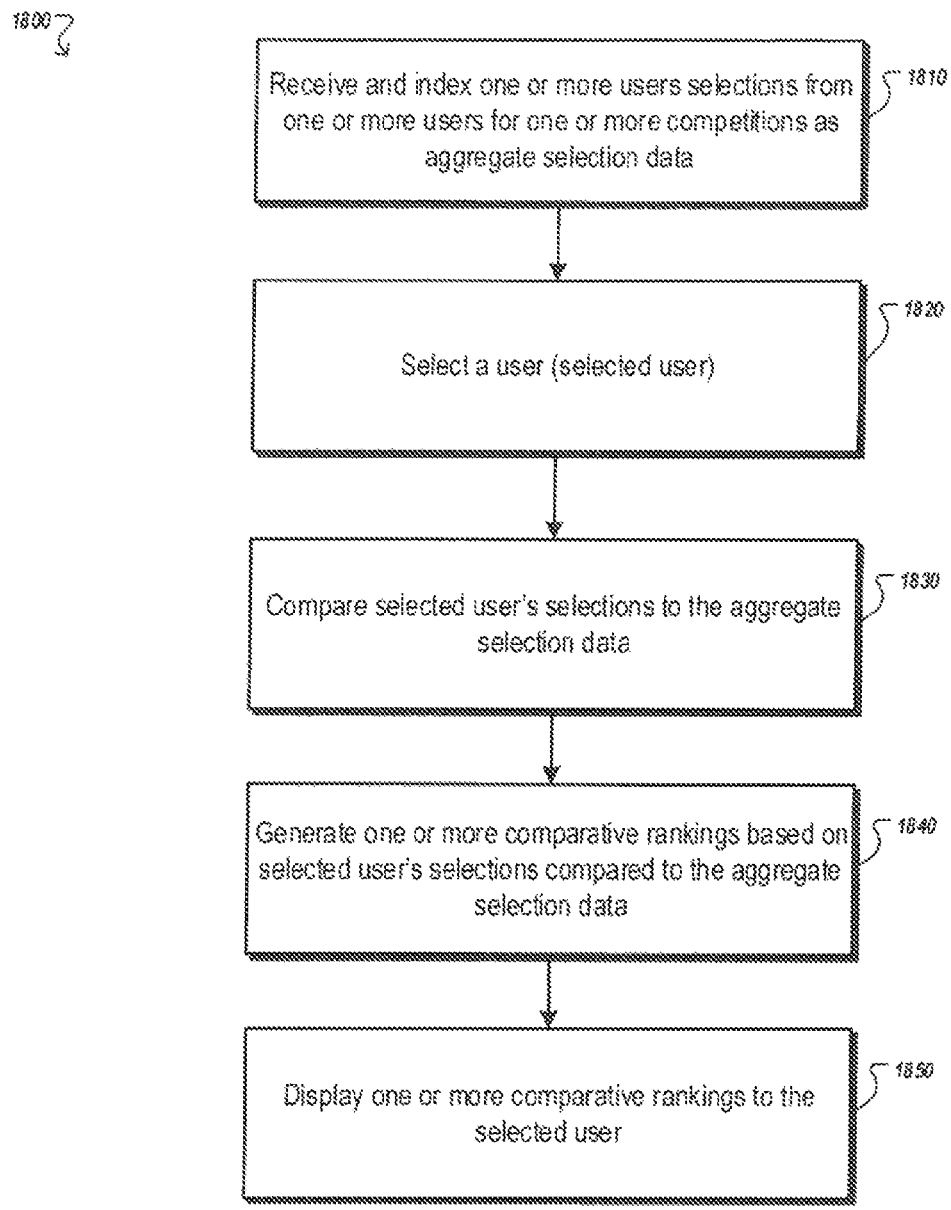
FIG. 18 depicts a process flowchart associated with comparative rankings on the fantasy sports system.

FIG. 18 depicts a process flowchart 1800 associated with the fantasy sports system 105. Typically, as depicted in FIG. 18, comparative process 1800 includes the steps of 'receiving and indexing one or more user selections from one or more users for one or more competitions as aggregate selection data' 1810, 'selecting a selected user' 1820, 'comparing the selected user's selections to the aggregate selection data' 1830, 'generating one or more comparative rankings based on selected user's selection(s) compared to the aggregate selection data' 1840, and 'displaying the one or more comparative rankings to the selected user' 1850.

During 'receiving and indexing one or more user selections from one or more users for one or more competitions as aggregate selection data' 1810 step, system 105 typically may receive and store selection for contest entries from one or more users. This step 1810 typically may be similar and/or identical to step 1208, described above. In some implementations, aggregate selection data may be stored and/or analyzed to extract further data, such as the number of entrants who picked a particular player, the number of entrants selecting a particular roster, and/or the like.

Further, during 'selecting a selected user' 1820 step, system 105 typically may receive one or more selected users from a selecting user to compare against other stored data and/or users. For example, system 105 may automatically receive and/or select a logged-in user 1610 as the selected user 1330. In other implementations, users may select one or more other users to compare, track, and/or otherwise view within system 105 contests.

In some further implementations, system 105 may allow users to track one or more users, lists of users, and/or the like as "watched" users. These lists may be, in some implementations, logged-in user 1610 created, user base sourced, system 105 curated (e.g., based on leader boards for points, most winning, etc.), and/or the like.

Additionally, during 'comparing the selected user's selections to the aggregate selection data' 1830, system 105 typically may compare the selected user's data to the aggregate data. For example, logged-in user 1610 may be compared to the current top ten entrants based on points, trends, PMR, and/or like data. This comparison may then be stored and/or otherwise transferred into comparative rankings for 1840 step.

During 'generating one or more comparative rankings based on selected user's selection(s) compared to the aggregate selection data' 1840 step, system 105 typically may receive the comparative user selections and fantasy scores, ranking users accordingly. In some implementations, system 105 may perform additional processing and/or analysis. For example, system 105 may also analyze and/or generate predicted outcomes based on PMR for each user, player trends, shifts in third-party rankings and/or predictions, and/or the like.

Further, during 'displaying the one or more comparative rankings to the selected user' 1850 step, system 105 typically may generate and/or display comparative rankings to one or more users of system 105. For example, system 105 may present user with information on a summary interface, a detailed view interface, and/or the like, described above. Such comparative rankings and/or interfaces may allow users to root for and/or against competition players, entrants, and/or the like, while tracking their own progress and/or success. This integration and immersion may vastly increase user participation, engagement, and/or return with system 105.

Figure 19:
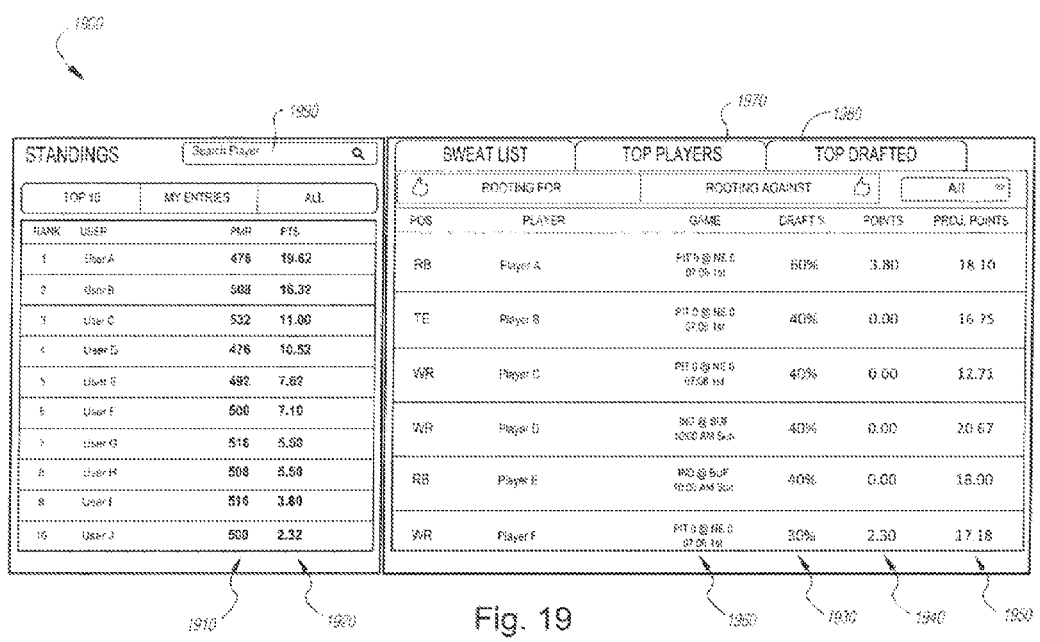
FIG. 19 depicts another screenshot of the competitive analysis view embodiment of the fantasy sports system.

In some implementations, as in the case of further processing and/or analysis operations, system 105 may then generate and/or display this information on one or more interfaces, and/or update the present comparative interface (e.g., as in FIGS. 13A-13B, 19, etc.). For example, a dynamic interface view may refresh periodically with real-time, dynamic predictions and/or outcomes. In some further examples, such predictions may be stored with system 105 and/or analyzed for predictive accuracy and/or precision, which may then be used to adjust and/or supplement future predictive measures on system 105.

FIG. 19 depicts an additional implementation of the competitive analysis view 1300 of the fantasy sports system 105. This implementation typically may include rankings 1900, users 910, player minutes remaining (PMR) 1910, points 1920, athletes (players) 950, percentage selection by competition(s) entrants 1930, points scored by player 1940, projected points by player 1950, games involved in 1960, top players selector 1970, top picked players selector 1980, search fields 1990, and/or the like.

FIG. 19's competitive analysis view 1300 typically may allow a system 105 user 910 to actively monitor and/or "sweat" ongoing system 105 competitions 820, similar to FIG. 13's implementation.

In one implementation, system 105 may identify one or more selections (e.g., athletes, players, draft picks, and/or the like) that users may select within system 105. System 105 may then determine, compared to the rest of users' picks within one or more competitions 820, what effect that specific player's and/or selection's actions during the competition 820 may have on a particular user's score, rank, and/or the like.

System 105 users may also review overall standings for one or more contests 820, review their own entries, estimate the potential growth of opponents based on current standings and real-life game progress, view individual player statistics, and/or the like. This interface 1900 may then operate as another general summary view for system 105 users to track both their and their opponents' standings and progress in one or more contests.

In some implementations, interface 1900 may be sorted by players who a user wants to score points (i.e., rooting for), doesn't want to score points (rooting against), has the most points (top players), and/or are most picked by other users in the contest (top drafted). These different views typically may allow a user to be highly integrated and involved with one or more daily fantasy contests compared to current platforms.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system 105 components in the embodiments described above should not be understood as requiring such separation in all embodiments, and it should be understood that the described program components and systems typically may be integrated together in a single hardware and/or software product or packaged into multiple hardware and/or software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for providing a fantasy sports system based on real-life sports and athlete statistics in the sports over a computer network configured to operate over a network using a server, a client, and a plurality of end-users, comprising:

the server operating the fantasy sports system, the server adapted to communicate with a network;

wherein the server is configured to:

generate at least two fantasy team rosters, each fantasy team roster including a plurality of distinct individual athletes, wherein each fantasy team roster is balanced to the others of the at least two fantasy team rosters based on one of historical data from a database of computed fantasy sports statistics and a database of predictive modeling of projected individual fantasy sports statistics;

receive at least two selected teams within the at least two fantasy team rosters from at least two users;

obtain real-time statistics of the plurality of individual athletes of the selected teams;

create a dynamic database comprising fantasy scoring of the plurality of individual athletes of the selected teams based on a fantasy scoring scheme;

display in real time the dynamic database comparing the fantasy sports statistics for each fantasy team roster to determine which fantasy team roster has amassed higher scoring fantasy sports statistics based on the fantasy scoring scheme; and cancel a fantasy competition when the users are not matched with a threshold value of opponents.

2. A system for providing a fantasy sports system based on real-life sports and athlete statistics in the sports over a computer network configured to operate over a network using a server, a client, and a plurality of end-users, comprising:

the server operating the fantasy sports system, the server adapted to communicate with a network;

wherein the server is configured to:

generate at least two fantasy team rosters, each fantasy team roster including a plurality of distinct individual athletes, wherein each fantasy team roster is balanced to the others of the at least two fantasy team rosters based on one of historical data from a database of computed fantasy sports statistics and a database of predictive modeling of projected individual fantasy sports statistics;

receive at least two selected teams within the at least two fantasy team rosters from at least two users;

obtain real-time statistics of the plurality of individual athletes of the selected teams;

create a dynamic database comprising fantasy scoring of the plurality of individual athletes of the selected teams based on a fantasy scoring scheme;

display in real time the dynamic database comparing the fantasy sports statistics for each fantasy team roster to determine which fantasy team roster has amassed higher scoring fantasy sports statistics based on the fantasy scoring scheme; and generate modified fantasy team rosters based on preferentially weighted fantasy scores that no longer balanced to the other fantasy team rosters.

* * * * *